United States Patent
Shimizu et al.

(10) Patent No.: US 8,308,612 B2
(45) Date of Patent: Nov. 13, 2012

(54) DRIVE UNIT AND VEHICLE

(75) Inventors: Tetsuya Shimizu, Anjo (JP); Kenichi Tsuchida, Anjo (JP); Akitomo Suzuki, Anjo (JP); Kazunori Ishikawa, Toyota (JP); Kazuhiko Kato, Anjo (JP)

(73) Assignee: Aisin Aw Co., Ltd., Anjo (JP)

( * ) Notice: Subject to any disclaimer, the term of this patent is extended or adjusted under 35 U.S.C. 154(b) by 586 days.

(21) Appl. No.: 12/461,073

(22) Filed: Jul. 30, 2009

(65) Prior Publication Data
US 2010/0028168 A1 Feb. 4, 2010

(30) Foreign Application Priority Data
Jul. 30, 2008 (JP) .................................. 2008-196591

(51) Int. Cl.
*F16H 61/26* (2006.01)
*F16H 31/00* (2006.01)
*F04B 17/04* (2006.01)

(52) U.S. Cl. .................... 477/164; 475/127; 417/416

(58) Field of Classification Search .................. 477/156, 477/157, 164; 475/127; 417/15, 415, 416, 417/417

See application file for complete search history.

(56) References Cited

U.S. PATENT DOCUMENTS

| | | | |
|---|---|---|---|
| 6,390,947 B1 * | 5/2002 | Aoki et al. | 477/3 |
| 6,742,994 B2 | 6/2004 | Hironaka et al. | |
| 7,163,481 B2 * | 1/2007 | Takagi et al. | 475/101 |
| 2001/0016165 A1 * | 8/2001 | Shimabukuro et al. | 417/2 |
| 2003/0045988 A1 | 3/2003 | Suzuki et al. | |
| 2011/0203682 A1 * | 8/2011 | Ishikawa et al. | 137/487.5 |
| 2011/0293449 A1 * | 12/2011 | Shimizu et al. | 417/415 |

FOREIGN PATENT DOCUMENTS

| | | |
|---|---|---|
| JP | U-1-166777 | 11/1989 |
| JP | A-10-331765 | 12/1998 |
| JP | A-11-82293 | 3/1999 |
| JP | A-2000-45932 | 2/2000 |
| JP | A-2003-74689 | 3/2003 |
| JP | A-2003-278666 | 10/2003 |

* cited by examiner

*Primary Examiner* — Roger Pang
(74) *Attorney, Agent, or Firm* — Oliff & Berridge, PLC

(57) ABSTRACT

A drive unit that includes a solenoid device that includes: a solenoid section having a movable portion that abuts on a case to arrive at an initial state when de-energized; a pump section axially sliding in association with a movement of the movable portion by an electromagnetic force of the solenoid section and pumping a hydraulic fluid by reciprocation; and an elastic member biasing the pump section in a direction counter to the electromagnetic force of the solenoid section; and a control unit that controls the solenoid device so that a current applied to the solenoid section is repeatedly increased and decreased between an upper limit value and a lower limit value that is greater than 0.

6 Claims, 10 Drawing Sheets

FIG.3

|   |   | C1 | C2 | C3 | B1 | B2 | B3 | B4 | F1 | F2 | F3 |
|---|---|---|---|---|---|---|---|---|---|---|---|
|   | P |   |   |   |   |   |   |   |   |   |   |
|   | R |   |   | O | (O) |   |   | O | O |   |   |
|   | N |   |   |   |   |   |   |   |   |   |   |
| D | 1st | O |   |   |   |   |   | (O) |   |   | O |
|   | 2nd | O |   |   |   | (O) | O |   | O | O |   |
|   | 3rd | O |   | O | (O) |   | ● |   | O |   |   |
|   | 4th | O | O | ● |   |   | ● |   |   |   |   |
|   | 5th |   | O | O | O |   | ● |   |   |   |   |

(O) : ENGINE BRAKE IN OPERATION
● : ENGAGED BUT NO TORQUE TRANSMITTED

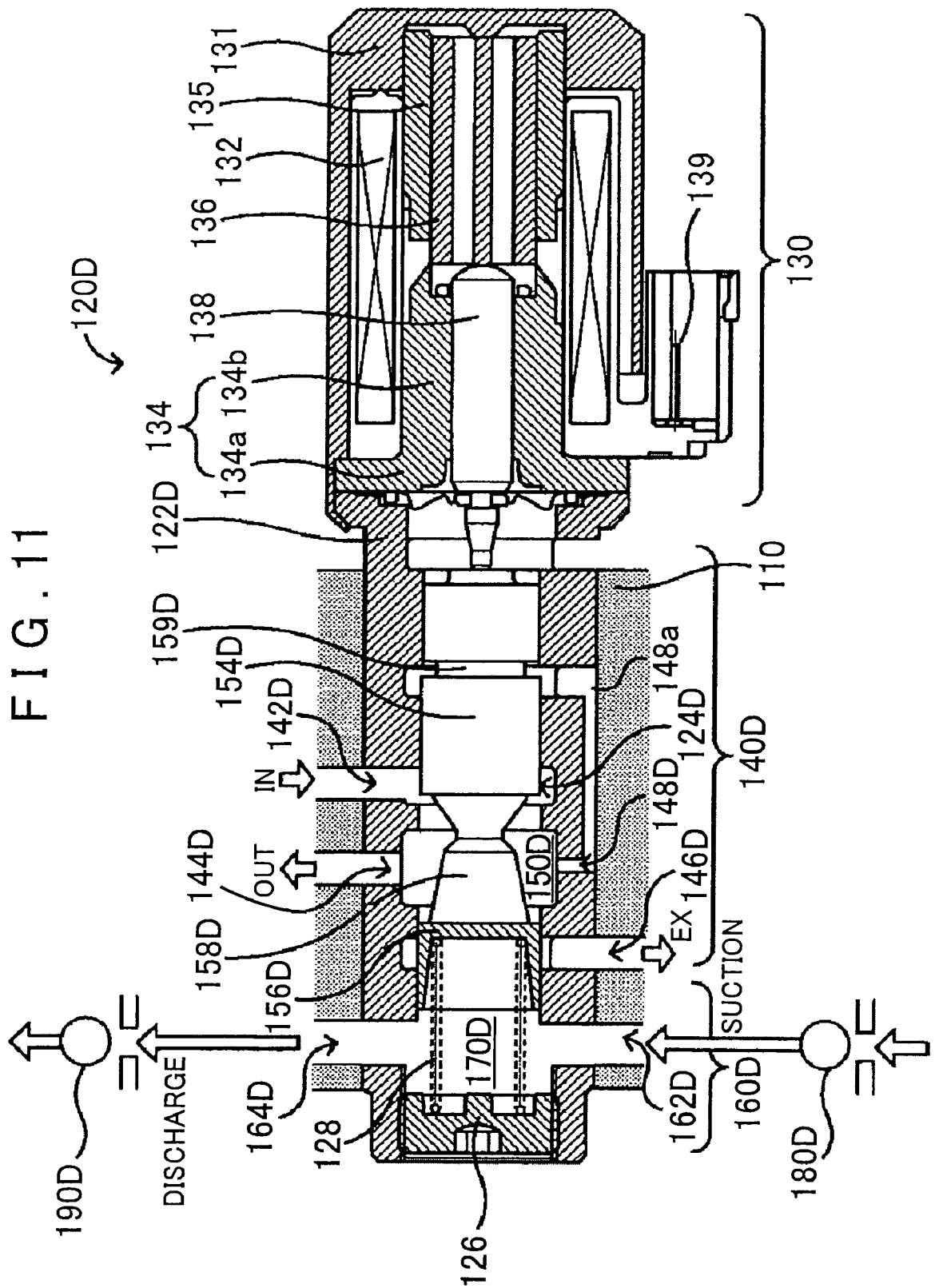

DRIVE UNIT AND VEHICLE

INCORPORATION BY REFERENCE

The disclosure of Japanese Patent Application No. 2008-196591 filed on Jul. 30, 2008 including the specification, drawings and abstract is incorporated herein by reference in its entirety.

BACKGROUND OF THE INVENTION

The present invention relates to a drive unit, and particularly, to a drive unit for a power transmission apparatus that drives a power transmission apparatus in a vehicle provided with an internal combustion engine capable of being automatically stopped and automatically started and the power transmission apparatus having a clutch and being capable of establishing a connection and breaking the connection between an output shaft of the internal combustion engine and a shaft on an axle side by switching an engagement state of the clutch, and a vehicle having the drive unit installed thereon.

As a vehicle of this type in related art, a vehicle has been proposed that is provided with an engine capable of being automatically stopped and automatically started and an automatic transmission for transmitting power from the engine, and that includes, as pumps for generating hydraulic pressure for engaging hydraulically driven clutches or brakes in the automatic transmission, a mechanical oil pump driven by the power from the engine, and an electric oil pump driven by the supply of electric power from a battery (for example, refer to Japanese Patent Application Publication No. JP-A-2003-74689). In this mechanism, when the engine is automatically stopped as the vehicle is stopped, the electric oil pump is driven in place of the mechanical oil pump so that a clutch C1 establishing the first forward speed is held in a state immediately before engagement. Thus, when starting off the vehicle by re-starting the engine and engaging the clutch C1 based on a start-off request from the driver, delay of the engagement of the clutch C1 can be prevented.

SUMMARY OF THE INVENTION

In a drive unit for an automatic transmission of the above-described type, the electric oil pump is typically arranged in parallel with the mechanical oil pump. A line pressure is generated by pumping oil from either one of the electric oil pump and the mechanical oil pump, and supplied to the entire hydraulic circuit. The line pressure in the hydraulic circuit is adjusted by a pressure adjusting valve and thereafter supplied to corresponding clutches and brakes. Accordingly, the electric oil pump is required to have relatively high pumping capacity, resulting in an increase in the volume of the electric oil pump and therefore in the size of the entire unit.

A main object of the present invention which provides a drive unit for a power transmission apparatus and a vehicle is to achieve downsizing of the unit, while achieving quick power transmission to the axle side when an internal combustion engine capable of being automatically stopped and automatically started is automatically started.

In order to achieve the aforementioned main object, the drive unit for a power transmission apparatus and the vehicle of the present invention have adopted the following means.

A drive unit according to a first aspect of the present invention includes a solenoid device and a control unit. The solenoid device includes: a solenoid section having a movable portion that abuts on a case to arrive at an initial state when de-energized; a pump section axially sliding in association with a movement of the movable portion by an electromagnetic force of the solenoid section and pumping a hydraulic fluid by reciprocation; and an elastic member biasing the pump section in a direction counter to the electromagnetic force of the solenoid section. The control unit controls the solenoid device so that a current applied to the solenoid section is repeatedly increased and decreased between an upper limit value and a lower limit value that is greater than 0.

In the drive unit according to the first aspect of the present invention, the solenoid device is controlled so that the current applied to the solenoid section having the movable portion that abuts on a case to arrive at an initial state when de-energized is repeatedly increased and decreased between an upper limit value and a lower limit value that is greater than 0. Accordingly, generation of any noise due to collision between the movable portion and the case can be suppressed. Further, by avoiding the collision between the movable portion and the case, abrasion powder which may be produced by the movable portion and the case worn by the collision can be reduced, and hence any possible malfunction arising from sticking, poor sliding, variations in the stroke volume and the like of the movable portion can be prevented. Still further, durability of the movable portion and the case can also be improved.

In the drive unit according to the first aspect of the present invention, the solenoid device may include a valve element that adjusts a fluid pressure from a fluid pressure source, and the pump section may pump the hydraulic fluid by reciprocation of the valve element sliding in association with the movement of the movable portion. Thus, the unit can be more compact. It is to be noted that the movable portion of the solenoid section includes, besides a movable portion formed separately from the valve element, a movable portion formed integrally with the valve element.

In the drive unit for a power transmission apparatus according to the first aspect of the present invention, which drives the power transmission apparatus in a vehicle provided with an internal combustion engine capable of being automatically stopped and automatically started and the power transmission apparatus having a friction engagement element and being capable of establishing a connection and breaking the connection between an output shaft of the internal combustion engine and a shaft on an axle side by switching an engagement state of the friction engagement element, the control unit may be a unit that, when the internal combustion engine is automatically stopped, repeatedly increases and decreases the current applied to the solenoid section between an upper limit value and a lower limit value that is set to a first predetermined current in preparation for causing the solenoid device to function as a pump while the solenoid device adjusts and supplies the fluid pressure from the fluid pressure source to the friction engagement element, and thereafter repeatedly increases and decreases the current applied to the solenoid section between the upper limit value and a lower limit value that is set to a second predetermined current smaller than the first predetermined current and greater than 0.

Alternatively, the drive unit for a power transmission apparatus according to the first aspect of the present invention, which drives a power transmission apparatus in a vehicle provided with an internal combustion engine capable of being automatically stopped and automatically started and the power transmission apparatus having a friction engagement element and being capable of establishing a connection and breaking the connection between an output shaft of the internal combustion engine and a shaft on an axle side by switching an engagement state of the friction engagement element, may further include a mechanical pump driven by power from the internal combustion engine to pump the hydraulic fluid, and, as the solenoid device, a hollow sleeve in which various ports are formed, a spool that is a shaft-like member inserted into the sleeve and capable of opening and closing the various ports by axially sliding, the elastic member axially biasing the spool, and the solenoid section generating a thrust force with respect to the spool in a direction opposite to the elastic member. An input port for inputting the hydraulic fluid pumped from the mechanical pump, an output port for outputting the hydraulic fluid to the friction engagement element, and a discharge port may be formed as the various ports. A pressure adjusting chamber may be formed between the sleeve and the spool to function as a pressure adjusting valve that adjusts, while discharging from the discharge port, a fluid pressure input from the input port by axial sliding of the spool and that outputs the adjusted fluid pressure to the output port. A suction port and a discharge port for discharging the hydraulic fluid to the friction engagement element may be formed as the various ports. A pump chamber may be formed between the sleeve and the spool as a space blocked from the pressure adjusting chamber to function as a pump that sucks the hydraulic fluid via the suction port by sliding of the spool caused by a biasing force of the elastic member when the thrust force of the solenoid section is released, and that discharges the sucked hydraulic fluid via the discharge port by sliding of the spool caused by the thrust force generated by the solenoid section. The control unit may be a unit that operates the internal combustion engine, and, when the internal combustion engine is automatically stopped by breaking the connection between the output shaft of the internal combustion engine and the shaft on the axle side by engaging the friction engagement element using the solenoid device caused to function as the pressure adjusting valve, repeatedly increases and decreases the current applied to the solenoid section between an upper limit value and a lower limit value that is set to a first predetermined current in preparation for causing the solenoid device to function as the pump while the pressure adjusting valve supplies the fluid pressure to the friction engagement element, and thereafter repeatedly increases and decreases the current applied to the solenoid section between the upper limit value and a lower limit value that is set to a second predetermined current smaller than the first predetermined current, so that, by causing the solenoid device to function as the pump, the friction engagement element is held under a low pressure condition that is lower than a pressure under which the friction engagement element fully engages. Thus, since the solenoid device is caused to function as a pump to directly pump the hydraulic fluid to the friction engagement element in order to hold the friction engagement element under the low pressure condition, as compared with a case where an electric pump is provided in parallel with a mechanical pump so that, when the internal combustion engine is automatically stopped, the electric pump supplies via a pressure adjusting valve the hydraulic fluid to the friction engagement element so as to maintain the low pressure condition, the required pump amount of the hydraulic fluid can be reduced, and hence the solenoid device of a small size can be used. Further, since the preparation for causing the solenoid device to function as a pump is carried out while the fluid pressure from the pressure adjusting valve of the solenoid device is supplied to the friction engagement element, the solenoid device functioning as a pressure adjusting valve can smoothly be switched to function as a pump. Since the friction engagement element is held under the low pressure condition while the internal combustion engine is automatically stopped, when thereafter the internal combustion engine is automatically started, the friction engagement element can quickly be engaged and hence the connection between the shafts can quickly be established. The foregoing achieves downsizing of the unit as well as quick power transmission to the axle side when the internal combustion engine capable of being automatically stopped and automatically started is automatically started. Here, the "friction engagement element" includes, besides a clutch for connecting two rotational systems, a brake for connecting a single rotation system to a fixing system such as a case.

The drive unit according to the first aspect of the present invention in the mode for use in driving a power transmission apparatus may further include a switching valve for selectively switching a connection of a flow passage formed between the pressure adjusting section of the solenoid device and the friction engagement element and a connection of a flow passage formed between the pump section of the solenoid device and the friction engagement element using the hydraulic fluid pumped from the mechanical pump. Thus, the flow passages can smoothly be switched. In this case, the switching valve may be a valve that discharges the hydraulic fluid in the pump chamber in association with blocking of the flow passage formed between the discharge port of the pump section and the friction engagement element. Thus, the hydraulic fluid remaining in the pump chamber can be prevented from disturbing the movement of the spool when the solenoid device is caused to function as a pressure adjusting valve.

In the drive unit according to the first aspect of the present invention in the mode for use in driving a power transmission apparatus, the power transmission apparatus may be an automatic transmission, and the friction engagement element may be a friction engagement element for starting off a vehicle. Thus, the gear ratio for starting off the vehicle can quickly be established when the internal combustion engine is automatically started, allowing the vehicle to be started off smoothly.

A vehicle according to a second aspect of the present invention includes: an internal combustion engine capable of being automatically stopped and automatically started; a power transmission apparatus having a friction engagement element and being capable of establishing a connection and breaking the connection between an output shaft of the internal combustion engine and a shaft on an axle side by switching an engagement state of the friction engagement element; and the drive unit for a power transmission apparatus according to the first aspect of the present invention in the mode for use in driving the power transmission apparatus. Specifically, the drive unit basically drives a power transmission apparatus in a vehicle provided with an internal combustion engine capable of being automatically stopped and automatically started and the power transmission apparatus having a friction engagement element and being capable of establishing a connection and breaking the connection between an output shaft of the internal combustion engine and a shaft on an axle side by switching an engagement state of the friction engagement element, that further includes a mechanical pump driven by power from the internal combustion engine to pump the hydraulic fluid, and, as the solenoid device, a hollow sleeve in which various ports are formed, a spool that is a shaft-like member inserted into the sleeve and capable of opening and closing the various ports by axially sliding, the elastic member axially biasing the spool, and the solenoid section generating a thrust force with respect to the spool in a direction opposite to the elastic member. An input port for inputting the hydraulic fluid pumped from the mechanical pump, an output port for outputting the hydraulic fluid to the friction engagement element, and a discharge port are formed as the various ports. A pressure adjusting chamber is formed between the sleeve and the spool to function as a pressure adjusting valve that adjusts, while discharging from the discharge port, a fluid pressure input from the input port by axial sliding of the spool and that outputs the adjusted fluid pressure to the output port. A suction port and a discharge port for discharging the hydraulic fluid to the friction engagement element are formed as the various ports. A pump chamber is formed between the sleeve and the spool as a space blocked from the pressure adjusting chamber to function as a pump that sucks the hydraulic fluid via the suction port by sliding of the spool caused by a biasing force of the elastic member when the thrust force of the solenoid section is released, and that discharges the sucked hydraulic fluid via the discharge port by sliding of the spool caused by the thrust force generated by the solenoid section. The control unit is a unit that operates the internal combustion engine, and, when the internal combustion engine is automatically stopped by breaking the connection between the output shaft of the internal combustion engine and the shaft on the axle side by engaging the friction engagement element using the solenoid device caused to function as the pressure adjusting valve, repeatedly increases and decreases the current applied to the solenoid section between an upper limit value and a lower limit value that is set to a first predetermined current in preparation for causing the solenoid device to function as the pump while the pressure adjusting valve supplies the fluid pressure to the friction engagement element, and thereafter repeatedly increases and decreases the current applied to the solenoid section between the upper limit value and a lower limit value that is set to a second predetermined current smaller than the first predetermined current, so that, by causing the solenoid device to function as the pump, the friction engagement element is held under a low pressure condition that is lower than a pressure under which the friction engagement element fully engages.

Since the vehicle according to the second aspect of the present invention has the above-described drive unit according to the first aspect the present invention installed thereon, the advantageous effects similar to that achieved by the drive unit of the present invention, for example, downsizing of the unit together with quick power transmission to the axle side when the internal combustion engine capable of being automatically stopped and automatically started is automatically started, can be achieved.

BRIEF DESCRIPTION OF THE DRAWINGS

FIG. 3 is an operation table of the automatic transmission 30;

FIG. 11 is a schematic diagram showing the configuration of a solenoid valve 120D according to a modification example.

DETAILED DESCRIPTION OF THE EMBODIMENT

Next, an embodiment of the present invention will be described.

Figure 1:
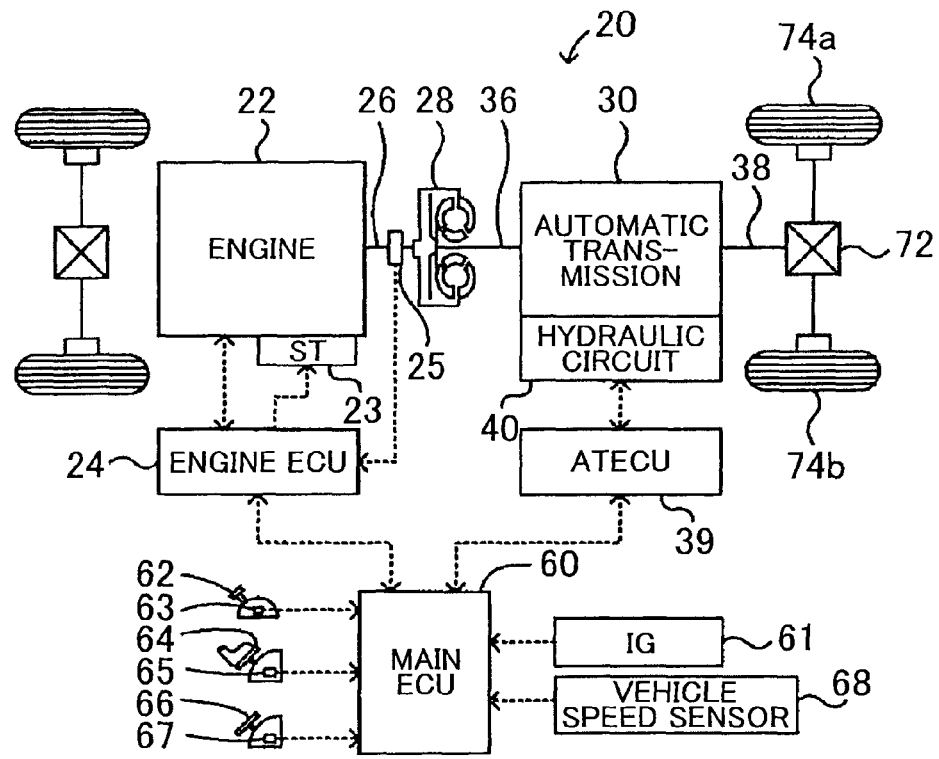
FIG. 1 is a schematic diagram showing the configuration of a motor vehicle 20 in which a drive unit for a power transmission apparatus according to an embodiment of the present invention is installed.
Figure 2:
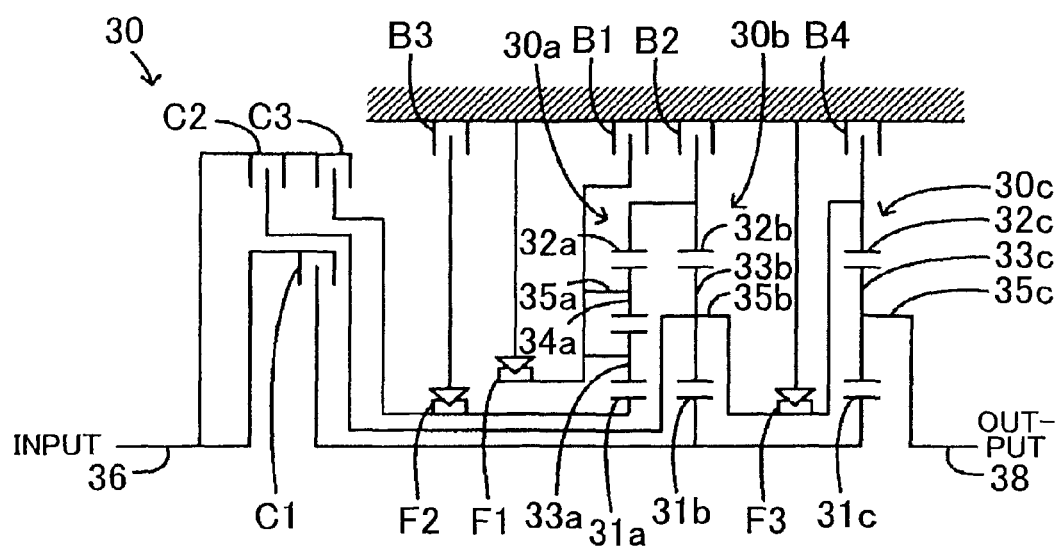
FIG. 2 is a schematic diagram showing the configuration of an automatic transmission 30.
Figure 4:
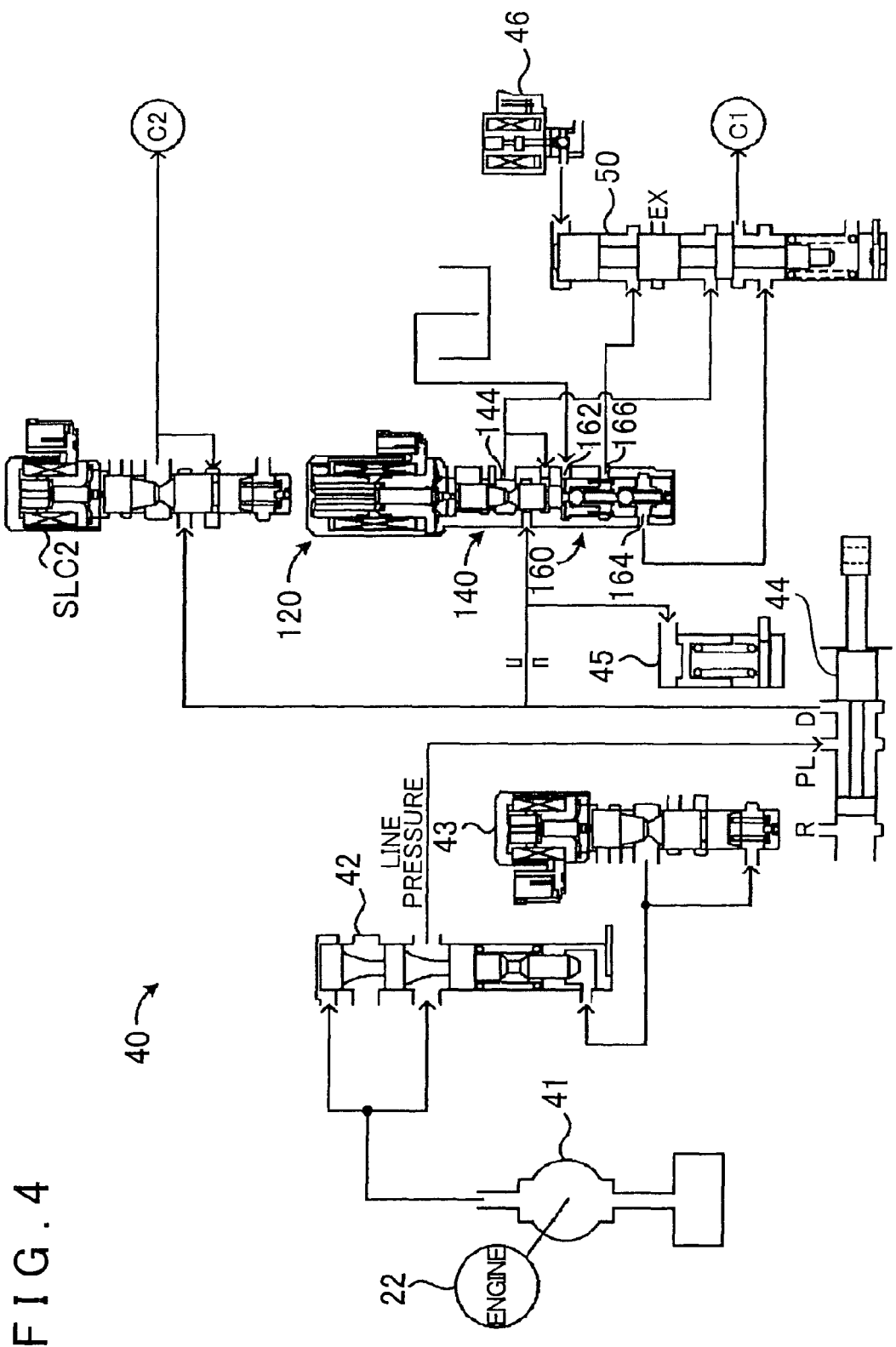
FIG. 4 is a schematic diagram showing the configuration of a hydraulic circuit 40.

FIG. 1 is a schematic diagram showing the configuration of a motor vehicle 20 in which a drive unit for a power transmission apparatus according to an embodiment of the present invention is installed. FIG. 2 is a schematic diagram showing the configuration of an automatic transmission 30. FIG. 3 is an operation table of the automatic transmission 30. FIG. 4 is a schematic diagram showing the configuration of a hydraulic circuit 40. The motor vehicle 20 is provided, as shown in FIG. 1, with an engine 22 as an internal combustion engine that outputs power by hydrocarbon fuels such as gasoline or diesel oil, a starter motor 23 for cranking the engine 22 to start up, an automatic transmission 30 having an input shaft 36 connected to a crankshaft 26 of the engine 22 via a torque converter 28 and an output shaft 38 connected to driving wheels 74a and 74b via a differential gear 72 for transmitting power input from the input shaft 36 to the output shaft 38, a hydraulic circuit 40 serving as an actuator for driving the automatic transmission 30, and a main electronic control unit (hereinafter referred to as a main ECU) 60 for controlling the whole vehicle.

The operation of the engine 22 is controlled by an engine electronic control unit (hereinafter referred to as an engine ECU) 24. The engine ECU 24 is structured, although not shown in details, as a microprocessor centering on a CPU, and is provided with, besides the CPU, a ROM for storing processing programs, a RAM for temporarily storing data, an I/O port, and a communication port. The engine ECU 24 is fed via the input port with signals required for controlling the operation of the engine 22 from various sensors, such as an engine speed sensor 25 installed on the crankshaft 26. The engine ECU 24 outputs via the output port a drive signal to a throttle motor for adjusting a throttle opening, a control signal to a fuel injector, an ignition signal to spark plugs, a drive signal to the starter motor 23 and the like. The engine ECU 24 communicates with the main ECU 60 to control the engine 22 by the control signal from the main ECU 60 and to output data relating to operating condition of the engine 22 to the main ECU 60 as required.

The automatic transmission 30 is provided, as shown in FIG. 2, with a planetary gear mechanism 30a of a double pinion type, two sets of planetary gear mechanisms 30b and 30c of a single pinion type, three sets of clutches C1, C2 and C3, four sets of brakes B1, B2, B3 and B4, and three sets of one-way clutches F1, F2 and F3. The double pinion type planetary gear mechanism 30a is provided with a sun gear 31a as an external gear, a ring gear 32a as an internal gear concentrically disposed with the sun gear 31a, a plurality of first pinion gears 33a meshing with the sun gear 31a, a plurality of second pinion gears 34a meshing with the first pinion gears 33a and the ring gear 32a, and a carrier 35a for coupling the plurality of first pinion gears 33a and the plurality of second pinion gears 34a with one another and holding the pinion gears to freely rotate and revolve. The sun gear 31a is coupled with the input shaft 36 via the clutch C3 and is adapted to rotate freely or in one direction restricted by switching on/off the brake B3 which is coupled via the one-way clutch F2. The ring gear 32a is adapted to rotate freely or be held stationary by switching on/off the brake B2. The carrier 35a is adapted to rotate in one direction restricted by the one-way clutch F1 and to rotate freely or be held stationary by switching on/off the brake B1. The single pinion type planetary gear mechanism 30b is provided with a sun gear 31b as an external gear, a ring gear 32b as an internal gear concentrically disposed with the sun gear 31b, a plurality of pinion gears 33b meshing with the sun gear 31b and the ring gear 32b, and a carrier 35b holding the plurality of pinion gears 33b to freely rotate and revolute. The sun gear 31b is coupled with the input shaft 36 via the clutch C1. The ring gear 32b is coupled with the ring gear 32a of the double pinion type planetary gear mechanism 30a and is adapted to rotate freely or be held stationary by switching on/off the brake B2. The carrier 35b is coupled with the input shaft 36 via the clutch C2 and is adapted to rotate in one direction restricted by the one-way clutch F3. Further, the single pinion type planetary gear mechanism 30c is provided with a sun gear 31c as an external gear, a ring gear 32c as an internal gear concentrically disposed with the sun gear 31c, a plurality of pinion gears 33c meshing with the sun gear 31c and the ring gear 32c, and a carrier 35c holding the plurality of pinion gears 33c to freely rotate and revolve. The sun gear 31c is coupled with the sun gear 31b of the single pinion type planetary gear mechanism 30b. The ring gear 32c is coupled with the carrier 35b of the single pinion type planetary gear mechanism 30b and is adapted to rotate freely or be held stationary by switching on/off the brake B4. The carrier 35c is coupled with the output shaft 38.

The automatic transmission 30 is adapted, as shown in FIG. 3, to switch positions of between first to fifth forward speeds, a reverse speed and neutral by switching on/off the clutches C1 to C3, and switching on/off the brakes B1 to B4. The first forward speed, more specifically, the state where the rotation of the input shaft 36 is transmitted to the output shaft 38 decelerated at the largest reduction ratio, can be established by switching on the clutch C1 and switching off the clutches C2 and C3 and the brakes B1 to B4. In this state, as the ring gear 32c of the single pinion type planetary gear mechanism 30c is fixed to rotate in one direction by the one-way clutch F3, the power input from the input shaft 36 to the sun gear 31c via the clutch C1 is decelerated at a large reduction ratio and is output to the carrier 35c, i.e., the output shaft 38. In the first forward speed, when engine brake is in operation, by switching on the brake B4, in place of the one-way clutch F3, the ring gear 32c is held stationary. The second forward speed can be established by switching on the clutch C1 and the brake B3 and switching off the clutches C2 and C3 and the brakes B1, B2 and B4. In this state, as the sun gear 31a of the double pinion type planetary gear mechanism 30a is fixed to rotate in one direction by the one-way clutch F2 and the carrier 35a is fixed to rotate in one direction by the one-way clutch F1, the ring gear 32a and the ring gear 32b of the single pinion type planetary gear mechanism 30b are also fixed to rotate in one direction and the power input from the input shaft 36 to the sun gear 31b via the clutch C1 is decelerated by the ring gear 32b being fixed and is output to the carrier 35b and the ring gear 32c of the single pinion type planetary gear mechanism 30c. The power input from the input shaft 36 to the sun gear 31c via the clutch C1 is decelerated at a slightly smaller reduction ratio than the first forward speed corresponding to the rotating condition of the ring gear 32c and is output to the carrier 35c, i.e., the output shaft 38. In the second forward speed, when the engine brake is in operation, by switching on the brake B2, in place of the one-way clutch F1 and the one-way clutch F2, the ring gear 32a and the ring gear 32b are held stationary. The third forward speed is established by switching on the clutches C1 and C3 and the brake B3 and switching off the clutch C2 and the brakes B1, B2 and B4. In this state, as the carrier 35a of the double pinion type planetary gear mechanism 30a is fixed to rotate in one direction by the one-way clutch F1, the power input from the input shaft 36 to the sun gear 31a via the clutch C3 is decelerated and is output to the ring gear 32a and the ring gear 32b of the single pinion type planetary gear mechanism 30b. The power input from the input shaft 36 to the sun gear 31b via the clutch C1 is decelerated corresponding to the rotating condition of the ring gear 32b and is output to the carrier 35b and the ring gear 32c of the single pinion type planetary gear mechanism 30c. The power input from the input shaft 36 to the sun gear 31c via the clutch C1 is decelerated at a slightly smaller reduction ratio than the second forward speed corresponding to the rotating condition of the ring gear 32c and is output to the carrier 35c, i.e., the output shaft 38. In the third forward speed, when the engine brake is in operation, by switching on the brake B1, in place of the one-way clutch F1, the carrier 35a is held stationary. The fourth forward speed can be established by switching on the clutches C1 to C3 and the brake B3 and switching off the brakes B1, B2 and B4. In this state, as the input shaft 36 is connected to the sun gear 31b of the single pinion type planetary gear mechanism 30b and the sun gear 31c of the single pinion type planetary gear mechanism 30c via the clutch C1 and is connected to the carrier 35b and the ring gear 32c via the clutch C2, all the rotating elements of the single pinion type planetary gear mechanisms 30b and 30c rotate as a unit, and the input shaft 36 and the output shaft 38 are directly connected, whereby the power input from the input shaft 36 is transmitted at a value of 1.0 reduction ratio. In the fifth forward speed, more specifically, the state where the rotation of the input shaft 36 is transmitted to the output shaft 38, with the rotation decelerated at the smallest reduction ratio (acceleration), can be established by switching on the clutches C2 and C3 and the brakes B1 and B3 and switching off the clutch C1 and the brakes B2 and B4. In this state, as the carrier 35a of the double pinion type planetary gear mechanism 30a is held stationary by the brake B1, the power input from the input shaft 36 to the sun gear 31a via the clutch C3 is decelerated and is output to the ring gear 32a and the ring gear 32b of the single pinion type planetary gear mechanism 30b. The power input from the input shaft 36 to the carrier 35b via the clutch C2 is accelerated corresponding to the rotating condition of the ring gear 32b and is output to the sun gear 31b and the sun gear 31c of the single pinion type planetary gear mechanism 30c. The power input from the input shaft 36 to the ring gear 32c via the clutch C2 is accelerated at the smallest reduction ratio corresponding to the rotating condition of the sun gear 31c and is output to the carrier 35c, i.e., the output shaft 38.

Further, in the automatic transmission 30, the neutral state, more specifically, the input shaft 36 and the output shaft 38 can be separated by switching off all the clutches C1 to C3 and the brakes B1 to B4. Furthermore, the reverse state can be established by switching on the clutch C3 and the brake B4 and switching off the clutches C1 and C2 and the brakes B1 to B3. In this state, as the carrier 35a of the double pinion type planetary gear mechanism 30a is fixed to rotate in one direction by the one-way clutch F1, the power input from the input shaft 36 to the sun gear 31a via the clutch C3 is decelerated and is output to the ring gear 32a and the ring gear 32b of the single pinion type planetary gear mechanism 30b. As the carrier 35b of the single pinion type planetary gear mechanism 30b and the ring gear 32c of the single pinion type planetary gear mechanism 30c are held stationary by the brake B4, the power output to the ring gear 32a results in reverse rotation and is output to the carrier 35c, i.e., the output shaft 38. In the reverse state, when the engine brake is in operation, by switching on the brake B1, in place of the one-way clutch F1, the carrier 35a is held stationary.

Figure 5:
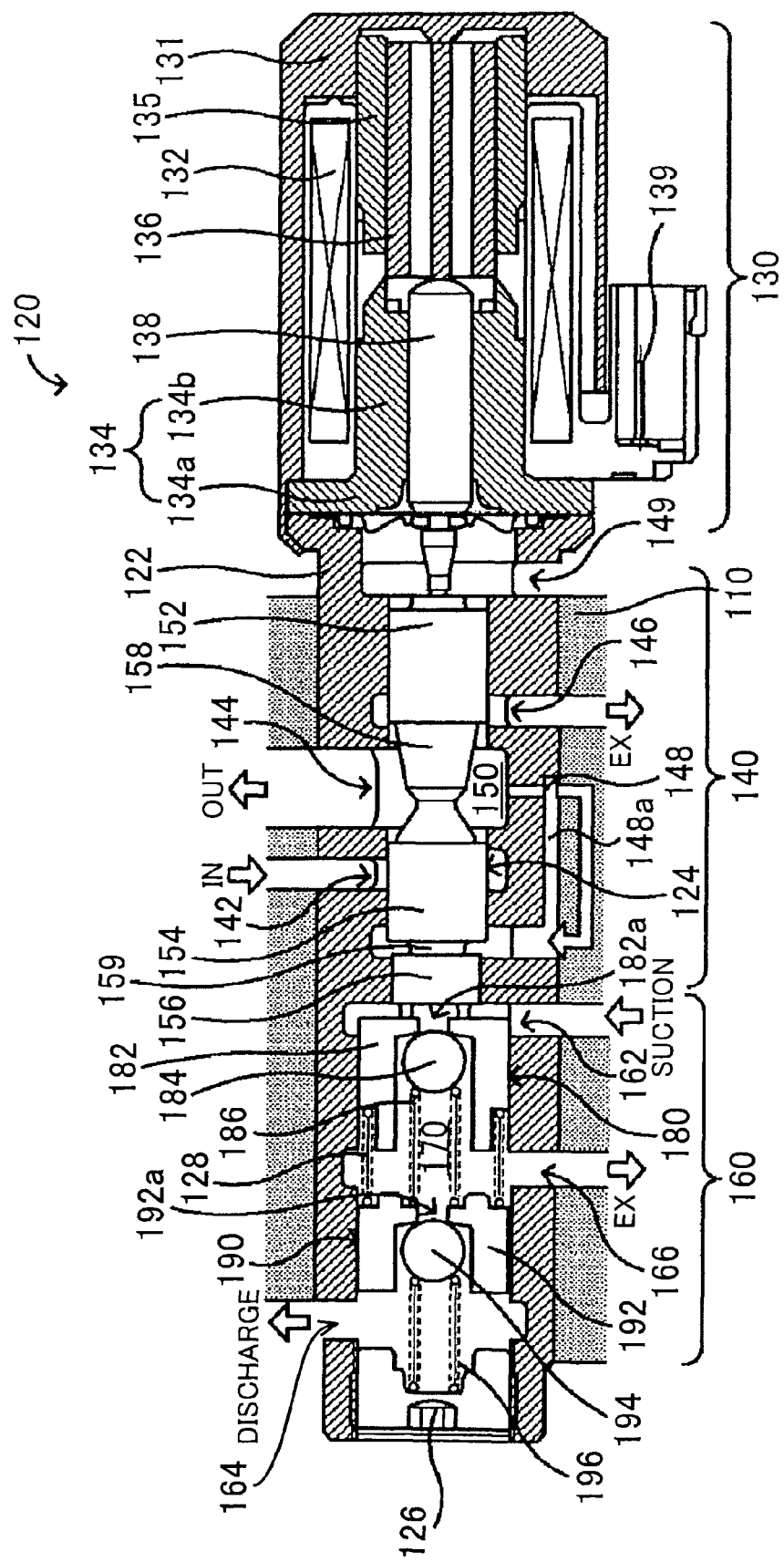
FIG. 5 is a schematic diagram showing the configuration of a solenoid valve 120.

The hydraulic circuit 40 is structured, as shown in FIG. 4, with the elements such as: a mechanical oil pump 41 for pumping hydraulic oil by the power from the engine 22; a regulator valve 42 for adjusting the pressure of the hydraulic oil (line pressure PL) pumped from the mechanical oil pump 41; a linear solenoid 43 for adjusting the line pressure PL fed through a not-shown modulator valve and outputting the adjusted line pressure PL as a signal pressure so as to drive the regulator valve 42; a solenoid valve 120 provided with a pressure adjusting valve section 140 for receiving an input of the line pressure PL through a manual valve 44, adjusting the received line pressure PL, and outputting the adjusted line pressure PL to the clutch C1 side, and a pump section 160 for sucking hydraulic oil using an electromagnetic force and pumping the sucked hydraulic oil to the clutch C1 side; an accumulator 45 for accumulating the line pressure PL supplied to the pressure adjusting valve section 140 of the solenoid valve 120; a switching valve 50 for selectively switching the connections of the flow passage formed between the pressure adjusting valve section 140 and the clutch C1 and the flow passage formed between the pump section 160 and the clutch C1; an on/off solenoid 46 providing on/off output according to the line pressure PL as the signal pressure that is input through the not-shown modulator valve so as to drive the switching valve 50; and a linear solenoid valve (hereinafter referred to as a linear solenoid) SLC2 for receiving an input of the line pressure PL through the manual valve 44, adjusting the received line pressure PL, and outputting the adjusted line pressure PL to the clutch C2 side. In FIG. 4, while the hydraulic system for the clutches C1 and C2 is shown, the hydraulic systems for, other than the clutches C1 and C2, the clutch C3 and the brakes B1 to B4 may also be similarly structured. In the following, the solenoid valve 120 incorporated in the hydraulic circuit 40 will be described in detail. FIG. 5 is a schematic diagram showing the configuration of the solenoid valve 120.

The solenoid valve 120 is structured to function as a direct control pressure adjusting valve for directly controlling the clutches by generating optimum clutch pressure from the line pressure and to function as a solenoid pump for generating hydraulic pressure, and is provided with, as shown in FIG. 5, a solenoid section 130, the pressure adjusting valve section 140 driven by the solenoid section 130 for receiving the input of the line pressure, adjusting the received line pressure, and outputting the adjusted line pressure, and the pump section 160 also driven by the solenoid section 130 for pumping hydraulic oil.

The solenoid section 130 is provided with: a case 131 as a cylindrical member having an open end and a closed bottom end; a coil (solenoid coil) 132 that is disposed on an inner periphery of the case 131 with an insulated electrical conductor wound around an insulating bobbin; a first core 134 including a flange portion 134a having a flange outer peripheral portion fixed to the open end of the case 131 and a cylindrical portion 134b axially extending from the flange portion 134a along an inner peripheral surface of the coil 132; a cylindrical second core 135 that abuts on the inner peripheral surface of a recessed portion formed at the bottom of the case 131 and axially extends along the inner peripheral surface of the coil 132 to a position from which the cylindrical portion 134b of the first core 134 is separated by a predetermined gap; a plunger 136 that is inserted in the second core 135 and axially slidable on inner peripheral surfaces of the first core 134 and the second core 135; and a shaft 138 that is inserted in the cylindrical portion 134b of the first core 134, abuts on the tip of the plunger 136, and is axially slidable on an inner peripheral surface of the cylindrical portion 134b. Further, in the solenoid section 130, terminals from the coil 132 are connected to a connector portion 139 formed on an outer peripheral surface of the case 131, and the coil 132 is energized through these terminals. The case 131, the first core 134, the second core 135, and the plunger 136 are all composed of a ferromagnetic material such as highly pure iron, and a space between an end face of the cylindrical portion 134b of the first core 134 and an end face of the second core 135 is formed to serve as a non-magnetic body. As this space is to serve as a non-magnetic body, a non-magnetic material such as stainless steel or brass may be provided in the space.

In the solenoid section 130, when the coil 132 is energized, a magnetic circuit is formed where magnetic flux flows around the circumference of the coil 132 in the order of the case 131, the second core 135, the plunger 136, the first core 134, and the case 131. Consequently, an attractive force is acted on between the first core 134 and the plunger 136 to attract the plunger 136. As described above, since the tip of the plunger 136 abuts on the shaft 138 that is axially slidable on the inner peripheral surface of the first core 134, the shaft 138 is pushed forward (leftward in the drawing) by the attraction of the plunger 136.

The pressure adjusting valve section 140 and the pump section 160 are provided with, as common materials, a nearly cylindrical sleeve 122 that is incorporated in a valve body 110 and has one end attached to the first core 134 by the case 131 of the solenoid section 130, a spool 124 that is inserted in the internal space formed in the sleeve 122 and has one end abutting on the tip of the shaft 138 of the solenoid section 130, an end plate 126 screwed onto the other end of the sleeve 122, and springs 128 and 196 that are provided between the end plate 126 and the other end of the spool 124 and bias the spool 124 towards the solenoid section 130.

The sleeve 122 includes, as openings in a region that forms the pressure adjusting valve section 140, an input port 142 for inputting hydraulic oil, an output port 144 for discharging the hydraulic oil input to the clutch C2 side, a drain port 146 for draining the hydraulic oil input, and a feedback port 148 for causing feedback force to act on the spool 124 by inputting the hydraulic oil output from the output port 144 through an oil passage 148a formed by the inner surface of the valve body 110 and the outer surface of the sleeve 122 in a portion of the sleeve 122 that forms the pressure adjusting valve portion 140. Further, also formed at the end of the sleeve 122 on the solenoid section 130 side is a drain hole 149 for draining the hydraulic oil leaked from between the inner peripheral surface of the sleeve 122 and the outer peripheral surface of the spool 124 in association with sliding of the spool 124.

The sleeve 122 is formed, as openings in a region that forms the pump section 160, a suction port 162 for sucking hydraulic oil, a discharging port 164 for discharging the hydraulic oil sucked, and a drain port 166 for draining the hydraulic oil remaining when the function of the pump section 160 is stopped. The drain port 166 is adapted to drain hydraulic oil through the switching valve 50.

The spool 124 is formed as a shaft-like member to be inserted inside the sleeve 122, and is provided with: three columnar lands 152, 154 and 156 slidable on inner walls of the sleeve 122; a communicating portion 158 that is formed to couple the land 152 with the land 154, has an outer diameter smaller than the outer diameters of the lands 152 and 154, is formed in a tapered shape such that the outer diameter of the communication portion 158 becomes smaller towards the center from each of the lands 152 and 154, and communicates between each of the input port 142, the output port 144, and the drain port 146; and a coupling portion 159 that couples the land 154 with the land 156 having an outer diameter smaller than that of the land 154 and forms a feedback chamber together with an inner wall of the sleeve 122 such that the feedback force is acted on the spool 124 towards the solenoid section 130. The sleeve 122, the communicating portion 158 of the spool 124, and the lands 152 and 154 form a pressure adjusting chamber 150.

Further, built into the sleeve 122 are a suction check valve 180 and a discharge check valve 190. The sleeve 122, the suction check valve 180, and the discharge check valve 190 form a pump chamber 170. The suction check valve 180 is provided with a cylindrical body 182 that is coupled with the land 156 and formed with an opening 182a in the axial center for communicating the pump chamber 170 with the suction port 162, a ball 184, and a spring 186 for pressing the ball 184 against the opening 182a of the body 182. The suction check valve 180 is closed by the biasing force of the spring 186 when inside the pump chamber 170 is under a positive pressure, and is opened when inside the pump chamber 170 is under a negative pressure. On the other hand, the discharge check valve 190 is provided with a cylindrical body 192 that functions as a spring holder for receiving the spring 128 and the spring 186 of the suction check valve 180 and is formed with an opening 192a in the axial center thereof for communicating the pump chamber 170 with the discharge port 164, a ball 194, and a spring 196 with the end plate 126 as a spring holder for pressing the ball 194 against the opening 192a of the body 192. The discharge check valve 190 is closed by the biasing force of the spring 196 when inside the pump chamber 170 is under a negative pressure, and is opened when inside the pump chamber 170 is under a positive pressure. Accordingly, when the coil 132 of the solenoid section 130 is de-energized from an energized state, the spool 124 is moved towards the solenoid section 130 by the biasing force of the spring 128, thereby sucking hydraulic oil from the suction port 162 into the pump chamber 170 through the suction check valve 180. When the coil 132 of the solenoid section 130 is energized from a de-energized state, the spool 124 is moved towards the end plate 126 by the thrust force of the solenoid section 130, thereby discharging the sucked hydraulic oil from the discharge port 164 through the discharge check valve 190.

The operation of the solenoid valve 120 of the present embodiment thus structured, particularly when functioning as a pressure adjusting valve and as a solenoid pump, will be described. First, the operation of the solenoid valve 120 when functioning as a pressure adjusting valve will be described. Now, the coil 132 is not energized. In this case, as the spool 124 is moved towards the solenoid section 130 by the biasing force of the spring 128, the input port 142 is blocked by the land 154 while the output port 144 and the drain port 146 are placed in communication with each other through the communicating portion 158. Accordingly, no hydraulic pressure is acted on the clutch C1. When the coil 132 is energized, the plunger 136 is attracted to the first core 134 by the attractive force corresponding to the amount of current applied to the coil 132 causing the shaft 138 to be pushed out and thus the spool 124 abutting on the tip of the shaft 138 is moved towards the end plate 126. Consequently, the input port 142, the output port 144, and the drain port 146 are placed in communication with one another, and a part of the hydraulic oil input from the input port 142 is output to the output port 144 and the rest of the hydraulic oil is output to the drain port 146. Additionally, the hydraulic oil is supplied to the feedback chamber through the feedback port 148, and the feedback force corresponding to the output pressure of the output port 144 is acted on the spool 24 in the direction towards the solenoid section 130. Accordingly, the spool 124 stops at the position where the thrust force (attractive force) of the plunger 136, the spring force of the spring 128, and the feedback force just balance out. In this case, the larger the amount of current applied to the coil 132, more specifically, the larger the thrust force of the plunger 136, the more the spool 124 moves towards the end plate 126, thereby expanding the opening area of the input port 142 and reducing the opening area of the drain port 146. When the current applied to the coil 132 is maximized, the spool 124 is moved to the position that is closest to the end plate 126 within the range of movement of the plunger 136, and thus the input port 142 and the output port 144 are placed in communication with each other through the communicating portion 158 while the drain port 146 is blocked by the land 152, thereby cutting off the communication of the output port 144 and the drain port 146. Consequently, the maximum hydraulic pressure is acted on the clutch C1. As described in the foregoing, when the coil 132 is not being energized, as the input port 142 is blocked while the output port 144 is placed in communication with the drain port 146, it is apparent that the solenoid valve 120 functions as a normal-closed type solenoid valve.

Secondly, the operation of the solenoid valve 120 when functioning as a solenoid pump will be described. Now, the coil 132 is just de-energized after being energized. In this case, as the spool 124 is moved from the end plate 126 side towards the solenoid section 130 side, the pressure inside the pump chamber 170 becomes a negative pressure, opening the suction check valve 180 and closing the discharge check valve 190 so that the hydraulic oil is sucked into the pump chamber 170 from the suction port 162 through the suction check valve 180. When the coil 132 is energized from this state, as the spool 124 is moved from the solenoid section 130 side towards the end plate 126 side, the pressure inside the pump chamber 170 becomes under a positive pressure, closing the suction check valve 180 and opening the discharge check valve 190 so that the hydraulic oil sucked in the pump chamber 170 is discharged from the discharge port 164 through the discharge check valve 190. Consequently, by repeatedly energizing and de-energizing the coil 132, the solenoid valve 120 can be made to function as a solenoid pump for pumping hydraulic oil. This concludes the description of solenoid valve 120.

Figure 6A:
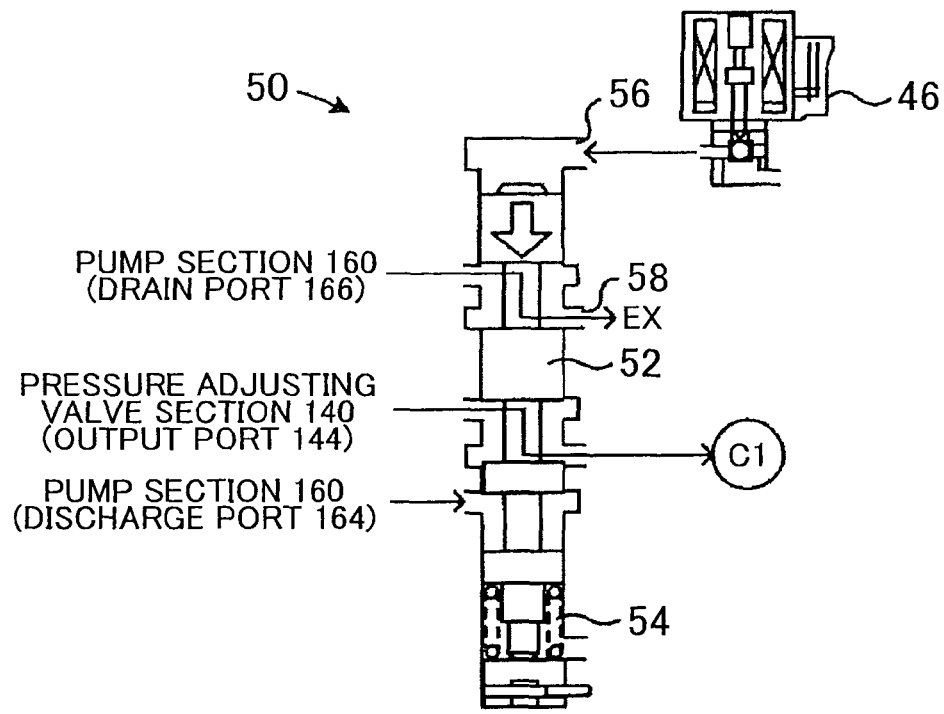
FIGS. 6A and 6B are illustrations explaining the operation of a switching valve 50.
Figure 6B:
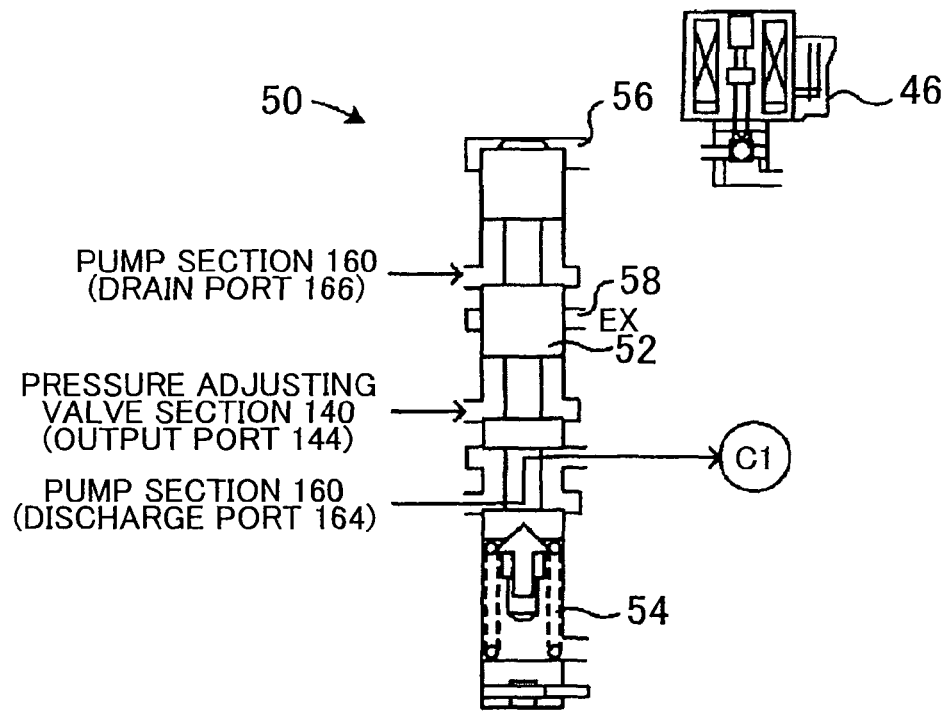

The switching valve 50, as shown in operational schematic diagrams in FIGS. 6A and 6B, is provided with a spring 54 at the lower part thereof for biasing a spool 52 upward in the drawing, and an input port 56 for inputting the signal pressure from the on/off solenoid 46 at the upper part thereof. When the signal pressure is input from the on/off solenoid 46, the signal pressure overcomes the biasing force of the spring 54 and thus the spool 52 is moved downward in the drawing, thereby connecting the flow passage formed between the output port 144 of the pressure adjusting valve section 140 and the clutch C1, blocking the flow passage formed between the discharge port 164 of the pump section 160 and the clutch C1, and connecting the flow passage formed between the drain port 166 of the pump section 160 and a drain port 58 (refer to FIG. 6A). When the signal pressure is not input from the on/off solenoid 46, the spool 52 is moved upward in the drawing by the biasing force of the spring 54, thereby blocking the flow passage formed between the output port 144 of the pressure adjusting valve section 140 and the clutch C1, connecting the flow passage formed between the discharge port 164 of the pump section 160 and the clutch C1, and blocking the flow passage formed between the drain port 166 of the pump section 160 and the drain port 58 (refer to FIG. 6B).

The hydraulic circuit 40 is drive controlled by an automatic transmission electronic control unit (hereinafter referred to as an ATECU) 39. The ATECU 39 is structured, although not shown in details, as a microprocessor centering on a CPU and is provided with, besides the CPU, a ROM for storing processing programs, a RAM for temporarily storing data, an I/O port, and a communication port. The ATECU 39 outputs drive signals to the linear solenoid 43, the solenoid valve 120, the linear solenoid SLC2, and the on/off solenoid 46, or the like, via the output port. The ATECU 39 communicates with the main ECU 60 to control the automatic transmission 30 (hydraulic circuit 40) by control signals from the main ECU 60 and to output the data relating to the status of the automatic transmission 30 to the main ECU 60 as required.

The main ECU 60 is structured, although not shown in details, as a microprocessor centering on a CPU, and is provided with, besides the CPU, a ROM for storing processing programs, a RAM for temporarily storing data, an I/O port, and a communication port. The main ECU 60 is fed with an ignition signal from an ignition switch 61, a shift position SP from a shift position sensor 63 which detects an operating position of a shift lever 62, an accelerator opening Acc from an accelerator pedal position sensor 65 which detects the amount of depression of an accelerator pedal 64, a brake switch signal BSW from a brake switch 67 which detects the depression of a brake pedal 66, and a vehicle speed V from a vehicle speed sensor 68 via the input port. The main ECU 60 is connected with the engine ECU 24 and the ATECU 39 via the communication port to exchange various control signals and data to and from the engine ECU 24 and the ATECU 39.

In the motor vehicle 20 of the present embodiment thus structured, while running with the shift lever 62 at the driving position of D (drive) after the engine 22 is started up, when all of predetermined auto-stop conditions as the value of the vehicle speed V is 0, the accelerator pedal is off, and the brake switch signal BSW is on, are satisfied, the engine 22 is automatically stopped. After the engine 22 is automatically stopped, when predetermined auto-start conditions as the brake switch signal BSW is off and the accelerator pedal is on are subsequently satisfied, the engine 22 that has been automatically stopped is then automatically started.

Figure 7:
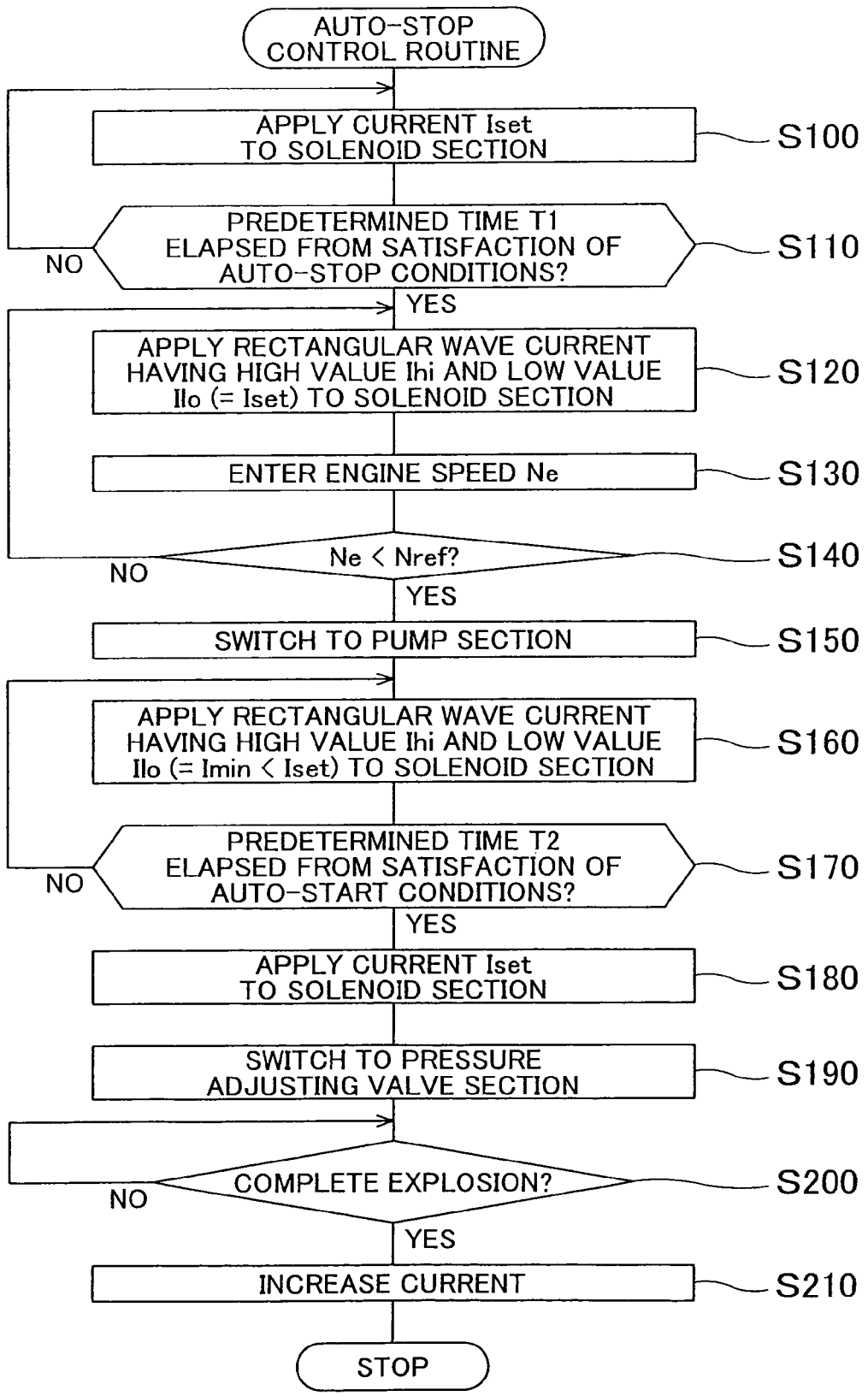
FIG. 7 is a flowchart showing an example of an auto-stop control routine.

Next, the operation of the drive unit for a power transmission apparatus in the present embodiment installed on the motor vehicle 20 thus structured, particularly the operation while the engine 22 is automatically stopped, will be described. The drive unit for a power transmission apparatus in the present embodiment corresponds to the hydraulic circuit 40 and the ATECU 39. FIG. 7 is a flowchart showing an example of an auto-stop control routine carried out by the ATECU 39. This routine is carried out when the auto-stop conditions for the engine 22 are satisfied while running with the shift lever 62 at the D position. In this running condition, the signal pressure is output from the on/off solenoid 46, and the switching valve 50 is in the state blocking the flow passage formed between the discharge port 164 of the pump section 160 and the clutch C1 and connecting the flow passage formed between the output port 144 of the pressure adjusting valve section 140 and the clutch C1.

When the auto-stop control routine is carried out, the CPU of the ATECU 39 first applies current Iset to the solenoid section 130 so that the clutch C1 engages with an engagement pressure corresponding to idling speed Nidle while the engine 22 is in an idling operation before fuel supply to the engine 22 is cut off following the satisfaction of the auto-stop conditions for the engine 22 (step S100), waits for a lapse of a predetermined time T1 from the satisfaction of the auto-stop conditions (step S110), and applies to the solenoid section 130 a rectangular wave current of a predetermined cycle F having the maximum current Imax applicable to the solenoid section 130 as the high value Ihi and the current Iset as the low value Ilo (step S120). Thus, the spool 124 reciprocates between a stroke position Shi corresponding to the high value Ihi and a stroke position Slo corresponding to the low value Ilo. Therefore, while the supply of hydraulic pressure to the clutch C1 from the pressure adjusting valve section 140 corresponding to the stroke position Slo of the spool 124 is ensured, hydraulic oil is introduced into the pump chamber 170 of the pump section 160 by the pumping effect attained by the reciprocation of the spool 124 so that the solenoid valve 120 is prepared to function as a solenoid pump. Accordingly, the predetermined time T1 may be set as a period obtained by subtracting the time required for the above-described preparation for causing the solenoid valve 120 to function as a solenoid pump from the time required from the satisfaction of the auto-stop conditions until the mechanical oil pump 41 ceases pumping of hydraulic oil as the engine 22 is stopped. The predetermined cycle F, in the present embodiment, has empirically been obtained as the cycle with which the solenoid valve 120 can fully exhibit performance as a solenoid pump.

Then, the engine speed Ne of the engine 22 is input (step S130). The process is repeated returning to step S120 until the input engine speed Ne of the engine 22 becomes not greater than a threshold value Nref determined as the engine speed immediately before the engine 22 is stopped (e.g., 100 rpm) (step S140). When the engine speed Ne becomes not greater than the threshold value Nref, the on-off solenoid 46 is controlled so that the switching valve 50 blocks the flow passage formed between the output port 144 of the pressure adjusting valve section 140 and the clutch C1 and connects the flow passage formed between the discharge port 164 of the pump section 160 and the clutch C1, thereby switching the solenoid valve 120 functioning as a pressure adjusting valve to function as a solenoid pump (step S150). A rectangular wave current of the predetermined cycle F having the maximum current Imax as the high value Ihi and a minimum current Imin as the low value Ilo is applied to the solenoid section 130 (step S160), awaiting for a lapse of a predetermined time T2 (which is immediately before start-up of the engine 22 is finished) from the subsequent satisfaction of the auto-start conditions (step S170). Here, the minimum current Imin is determined to be a value smaller than the current Iset and greater than 0. This is based on the following consideration. It is desirable to ensure the maximum stroke volume of the spool 124 employing the maximum current Imax as the high value Ihi and the value of 0 as the low value Ilo in order to maximize the pumping capacity of the solenoid valve 120 when the solenoid valve 12 functions as a solenoid pump. However, in this case, when the current applied to the solenoid section 130 is switched from on to off, the spring force of the springs 128 and 196 may cause the plunger 136 to collide with the case 131, producing noise which may discomfort the driver. Accordingly, the minimum current Imin is determined as a value that is as close to 0 as possible in the range where the plunger 136 does not collide with the case 131 by the reciprocation of the spool 124. By the processing above, the clutch C1 establishing the first forward speed is adapted to be replenished with hydraulic oil from the pump section 160 using a solenoid valve of low pumping capacity, for example, by the amount leaked from the seal ring or the like provided between the clutch piston and the drum, and to stand by under a low pressure Plo condition which is just enough for the clutch piston to be held at the stroke end position. In the present embodiment, the pump section 160 (the pumping capacity) of the solenoid valve 120 has been so designed that the low pressure Plo condition becomes the condition where the clutch C1 has a torque capacity capable of transmitting a torque slightly larger than a cranking torque by the starter motor 23 to the engine 22.

After a lapse of the predetermined time T2 from the satisfaction of the auto-stop conditions, the current Iset is applied to the solenoid section 130 (step S180). The on-off solenoid 46 is controlled so that the switching valve 50 connects the flow passage formed between the discharge port 164 of the pump section 160 and the clutch C1 and blocks the flow passage formed between the output port 144 of the pressure adjusting valve section 140 and the clutch C1, whereby the solenoid valve 120 functioning as a solenoid valve is switched to function as a pressure adjusting valve (step S190). When the engine 22 comes to be in complete explosion (step S200), the current applied to the solenoid section 130 is increased so as to establish full engagement of the clutch C1 (step S210), and the routine is ended. Thus, the clutch C1 is fully engaged, and the power from the engine 22 can be transmitted to the driving wheels 74a and 74b through the automatic transmission 30 at the first forward speed so as to start off the vehicle. It is to be noted that, as described above, when the switching valve 50 connects the flow passage formed between the discharge port 164 of the pump section 160 and the clutch C1 and blocks the flow passage formed between the output port 144 of the pressure adjusting valve section 140 and the clutch C1, the drain port 166 of the pump section 160 and the drain port 58 of the switching valve 50 accordingly communicate with each other, thereby draining the hydraulic oil remaining in the pump chamber 170. Therefore, the solenoid valve 120 will not be disturbed by the hydraulic oil remaining in the pump chamber 170 in functioning as a pressure adjusting pump.

Figure 8:
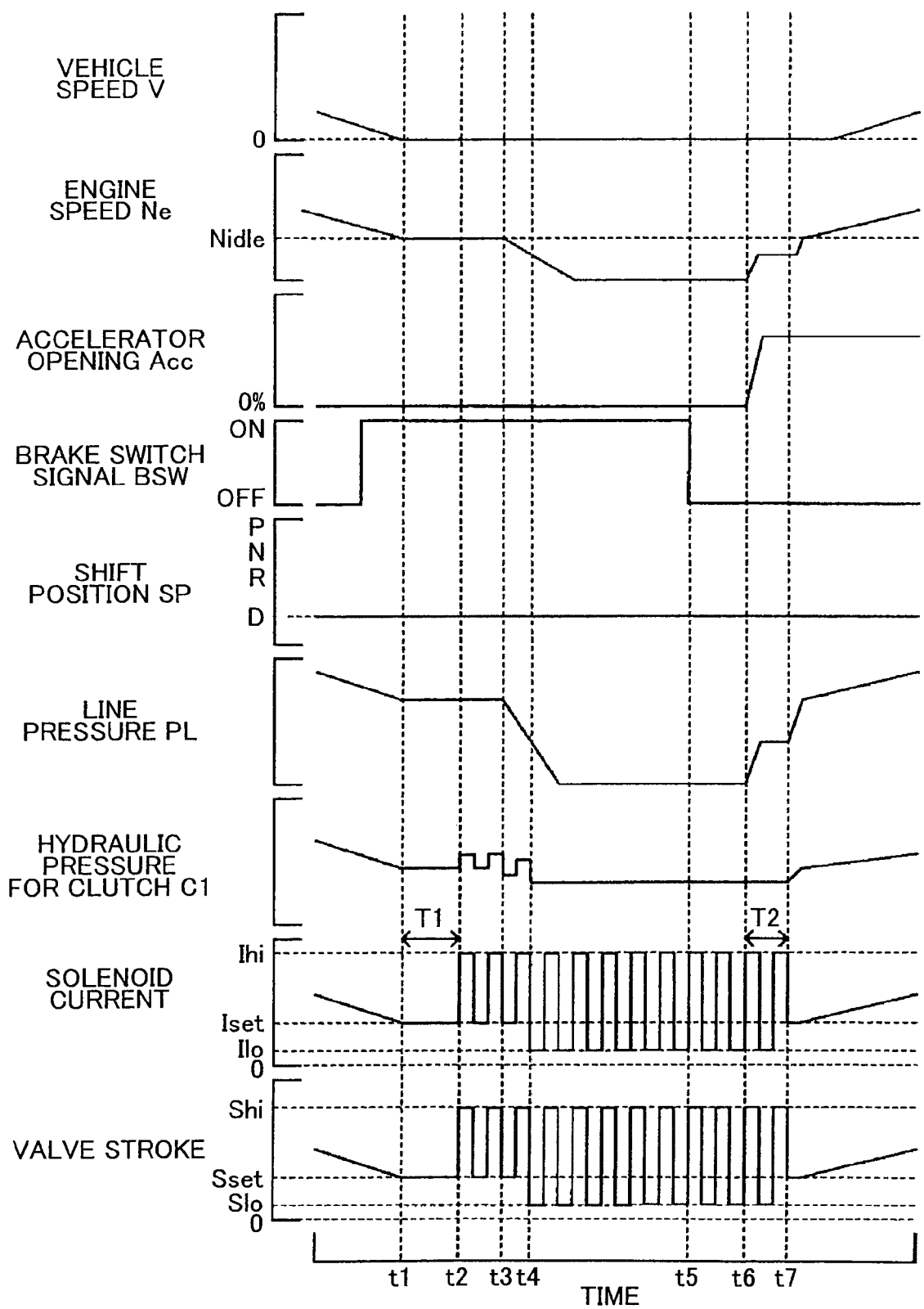
FIG. 8 is a timing chart showing the changes in time for a vehicle speed V, an engine speed Ne, an accelerator opening Acc, a brake switch signal BSW, a shift position SP, a line pressure PL, hydraulic pressure for a clutch C1, solenoid current for the solenoid valve 120 and the valve stroke of the solenoid valve 120.

FIG. 8 is a timing chart showing the changes in time for a vehicle speed V, an engine speed Ne, an accelerator opening Acc, a brake switch signal BSW, a shift position SP, a line pressure PL, hydraulic pressure for a clutch C1, current command for the solenoid section 130 of the solenoid valve 120 and the valve stroke of the solenoid valve 120. As shown in the timing chart, after a lapse of the predetermined time T1 from the satisfaction of the auto-stop conditions for the engine 22 at time point t1, the rectangular wave current of the predetermined cycle F having the maximum current Imax as the high value Ihi and the current Iset as the low value Ilo is applied to the solenoid section 130, in preparation for switching the solenoid valve 120 functioning as a pressure adjusting valve to function as a solenoid pump. At time point t3, the fuel supply to the engine 22 is cut off. At time point t4, when the engine speed Ne of the engine 22 becomes not greater than the engine speed immediately before the engine 22 is stopped (threshold value Nref), the switching valve 50 switches the function of the solenoid valve 120 from that as a pressure adjusting valve to that as a solenoid pump, and the rectangular wave current of the predetermined cycle F having the maximum current Imax as the high value Ihi and the minimum current Imin, which is smaller than the current Iset and greater than 0, as the low value Ilo is applied to the solenoid section 130, whereby the clutch C1 is held under the low pressure Plo condition. Here, since the low pressure Plo condition can be maintained by replenishing the hydraulic oil just by the amount leaked from the seal ring or the like, the required pumping performance can be met by a solenoid pump which has relatively low pumping capacity. When the auto-start conditions for the engine 22 are then satisfied as the brake is switched off at the time point t5 and the accelerator pedal is switched on at the time point t6, the engine 22 is cranked up by the starter motor 23. Here, as the hydraulic pressure of the clutch C1 is maintained under the low pressure Plo condition having a slightly larger torque capacity than the cranking torque, the cranking torque of the engine 22 is transmitted to the driving wheels 74a and 74b as creep torque through the clutch C1. When the cranking of the engine 22 is started, the switching valve 50 connects the flow passage formed between the discharge port 164 of the pump section 160 and the clutch C1 and blocks the flow passage formed between the output port 144 of the pressure adjusting valve section 140 and the clutch C1, thereby switching the solenoid valve 120 to function as a pressure adjusting valve. When the engine 22 comes to be in complete explosion at time point t7, the current applied to the solenoid section 130 is increased so that the clutch C1 is fully engaged.

The drive unit for a power transmission apparatus installed on the motor vehicle 20 of the present embodiment described in the foregoing includes the solenoid valve 120 that functions as a pressure adjusting valve for supplying the line pressure through the pressure adjusting valve section 140 to the clutch C1 establishing the first forward speed for starting off the vehicle, and also functions as a solenoid pump for directly supplying the hydraulic pressure from the pump section 160 to the identical clutch C1, so that, when the engine 22 is automatically stopped, the solenoid valve 120 is caused to function as a solenoid pump to directly pump the hydraulic oil to the clutch C1 without having a pressure adjusting valve interposed to hold the clutch C1 under the low pressure Plo condition. Therefore, the volume of the pump can drastically be reduced, as compared with the case where an electric oil pump is provided in parallel with the mechanical oil pump 41 so that, when the engine 22 is automatically stopped, the electric oil pump is driven to hold the clutch C1 under the low pressure Plo condition through a pressure adjusting valve. Additionally, since the sleeve 122 and the spool 124 form the pressure adjusting valve section 140 which functions as a pressure adjusting valve for adjusting the clutch pressure of the clutch C1, as well as the pump section 160 which functions as a solenoid pump for directly pumping hydraulic oil to the identical clutch C1, and the pressure adjusting valve section 140 and the pump section 160 are driven by the single solenoid section 130, downsizing of the unit can be achieved as compared with the case where the pressure adjusting valve and the solenoid pump are separately provided. Furthermore, in the present embodiment, when the auto-stop conditions for the engine 22 are satisfied, the rectangular wave current of the predetermined cycle F having the maximum current Imax as the high value Ihi and the current Iset as the low value Ilo is applied to the solenoid section 130 of the solenoid valve 120, and, while the supply of hydraulic pressure from the pressure adjusting valve section 140 to the clutch C1 is ensured, hydraulic oil is introduced into the pump chamber 170 of the pump section 160 due to the pumping effect by the reciprocation of the spool 124, whereby the solenoid valve 120 is prepared to function as a solenoid pump. When the engine 22 is stopped and the line pressure is off, the switching valve 50 blocks the flow passage formed between the output port 144 of the pressure adjusting valve section 140 and the clutch C1 and connects the flow passage formed between the discharge port 164 of the pump section 160 and the clutch C1, and the rectangular wave current of the predetermined cycle F having the maximum current Imax as the high value Ihi and a minimum current Imin smaller than the current Iset as the low value Ilo is applied to the solenoid section 130, whereby the clutch C1 is held under the low pressure Plo condition. Therefore, the solenoid valve 120 functioning as a pressure adjusting valve can be smoothly switched to function as a solenoid pump. As a matter of course, by causing the clutch C1 establishing the first forward speed for starting off the vehicle to stand by under the low pressure Plo condition during the auto-stop of the engine 22, the clutch C1 can quickly be fully engaged when the accelerator pedal 63 is depressed, and the vehicle can be started off smoothly.

In the drive unit for a power transmission apparatus installed on the motor vehicle 20 of the present embodiment, the rectangular wave current having the maximum current Imax as the high value Ihi and the minimum current Imin greater than 0 as the low value Ilo is applied to the solenoid section 130 during the auto-stop of the engine 22 to hold the clutch C1 establishing the first forward speed under the low pressure Plo condition. Alternatively, a rectangular wave current having the maximum current Imax as the high value Ihi and 0 as the low value Ilo may be applied to the solenoid section 130 to hold the clutch C1 under the low pressure Plo condition, although some noise may be produced in this case.

While the drive unit for a power transmission apparatus installed on the motor vehicle 20 of the present embodiment is structured as a linear solenoid valve for directly controlling the clutch C1 by generating an optimal clutch pressure from the line pressure PL when functioning as a pressure adjusting valve, the linear solenoid valve may be used as a pilot linear solenoid valve to drive a separate control valve, thereby controlling the clutch C1 with the clutch pressure generated by the control valve. In addition, the clutch C2 and the brakes B1 to B4 may be similarly structured.

In the drive unit for a power transmission apparatus installed on the motor vehicle 20 of the present embodiment, the clutch C1 stands by during the auto-stop of the engine 22 under the low pressure Plo condition with the torque capacity capable of transmitting a slightly larger torque than a cranking torque by the starter motor 23 to the engine 22. Alternatively, the clutch C1 may stand by under a low pressure condition immediately before engagement without a torque capacity. In this case, the pump section 160 of the solenoid valve 120 may be designed to have pumping capacity just enough to hold the clutch C1 under the low pressure condition where the clutch C1 should stand by. Additionally, the pump section 160 may be provided with a margin of pumping capacity, and the current applied to the solenoid section 130 may be controlled so as to maintain the low pressure condition of the clutch C1.

In the drive unit for a power transmission apparatus installed on the motor vehicle 20 of the present embodiment, the on-off solenoid 46 turns on/off the signal pressure (the line pressure PL) supplied to the input port 56 to drive the switching valve 50. Alternatively, the line pressure PL may be output directly (or via a modulator valve) to the input port 56. In this case, steps S150 and S190 in the auto-stop control routine shown in FIG. 7 are not necessary. In this case, since the line pressure PL is generated by the mechanical oil pump 41 when the engine 22 is in operation, the switching valve 50 blocks the flow passage formed between the discharge port 164 of the pump section 160 and the clutch C1 and connects the flow passage formed between the output port 144 of the pressure adjusting valve section 140 and the clutch C1. Further, since the line pressure PL is off when the engine 22 is stopped and therefore the mechanical oil pump 41 is stopped, the switching valve 50 connects the flow passage formed between the discharge port 164 of the pump section 160 and the clutch C1 and blocks the flow passage formed between the output port 144 of the pressure adjusting valve section 140 and the clutch C1.

Figure 9:
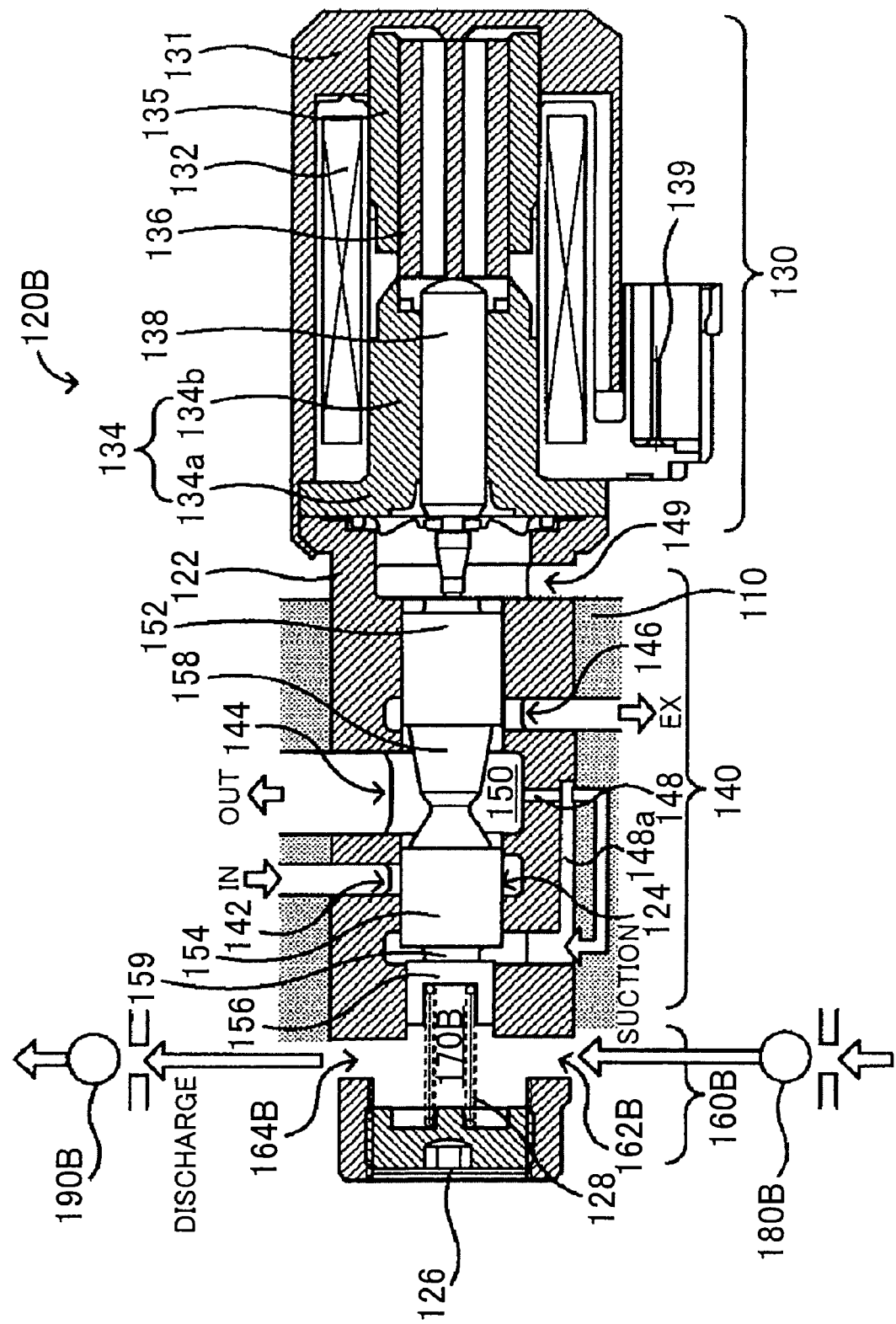
FIG. 9 is a schematic diagram showing the configuration of a solenoid valve 120B according to a modification example.

In the drive unit for a power transmission apparatus installed on the motor vehicle 20 of the present embodiment, the suction check valve 180 and the discharge check valve 190 are built into the sleeve 122. Alternatively, as a solenoid valve 120B of a modification example shown in FIG. 9, both a suction check valve 180B and a discharge check valve 190B may be incorporated in the valve body 110 external to the sleeve 122. In the solenoid valve 120B of the modification example, the solenoid section 130 and the pressure adjusting valve section 140 are structured identical to those in the solenoid valve 120 of the present embodiment. In a pump section 160B of the solenoid valve 120B, as shown in FIG. 9, a pump chamber 170B is formed by the sleeve 122, the land 156 of the spool 124, and the end plate 126. When the coil 132 of the solenoid section 130 is de-energized from the energized state, the spool 124 (land 156) is moved towards the solenoid section 130 by the biasing force of the spring 128, thereby sucking hydraulic oil from a suction port 162B into the pump chamber 170B through the suction check valve 180B incorporated in the valve body 110. When the coil 132 of the solenoid section 130 is energized from the de-energized state, the spool 124 is moved towards the end plate 126 by the thrust force of the solenoid section 130, thereby discharging the sucked hydraulic oil from a discharge port 164B through the discharge check valve 190B incorporated in the valve body 110.

Figure 10:
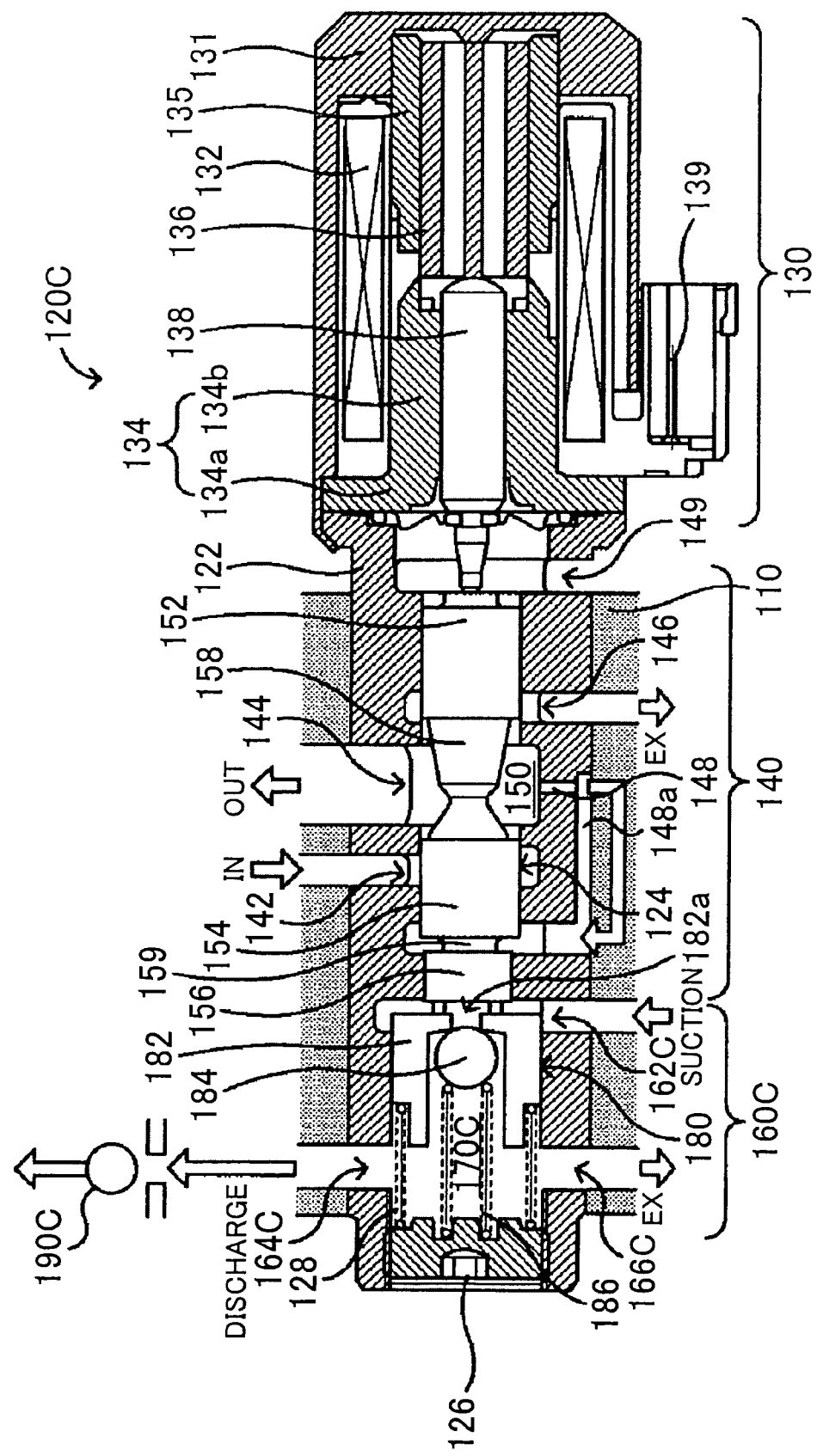
FIG. 10 is a schematic diagram showing the configuration of a solenoid valve 120C according to a modification example.

In the drive unit for a power transmission apparatus installed on the motor vehicle 20 of the present embodiment, the suction check valve 180 and the discharge check valve 190 are built into the sleeve 122. Alternatively, as a solenoid valve 120C of a modification example shown in FIG. 10, only the suction check valve 180 may be built into the sleeve 122 and a discharge check valve 190C may be incorporated in the valve body 110 external to the sleeve 122. In the solenoid valve 120C of the modification example, the solenoid section 130, the pressure adjusting valve section 140, the suction check valve 180 of a pump section 160C are structured identical to those in the solenoid valve 120 of the present embodiment. In the pump section 160C of the solenoid valve 120C, as shown in FIG. 10, when the coil 132 of the solenoid section 130 is de-energized from the energized state, the spool 124 is moved towards the solenoid section 130 by the biasing force of the spring 128, thereby sucking hydraulic oil from a suction port 162C into the pump chamber 170C through the opening 182a of the suction check valve 180. When the coil 132 of the solenoid section 130 is energized from the de-energized state, the spool 124 is moved towards the end plate 126 by the thrust force of the solenoid section 130, thereby discharging the sucked hydraulic oil from a discharge port 164C through the discharge check valve 190C incorporated in the valve body 110.

In the drive unit for a power transmission apparatus installed on the motor vehicle 20 of the present embodiment, the suction check valve 180 and the discharge check valve 190 are both built into the sleeve 122. Alternatively, the suction check valve 180 may be incorporated in the valve body 110 external to the sleeve 122 and the discharge check valve 190 may be built into the sleeve 122.

In the solenoid valve 120 of the present embodiment, the function as a solenoid pump is integrated into a so-called normal-closed type linear solenoid valve. Alternatively, as a solenoid valve 120D of a modification example shown in FIG. 11, the function as a solenoid pump may be integrated into a so-called normal-open type linear solenoid valve. The solenoid section 130 is structured identical to that in the solenoid valve 120 of the present embodiment. In a pressure adjusting valve section 140D of the solenoid valve 120D of the modification example, while the coil 132 is de-energized, as a spool 124D is moved towards the solenoid section 130 by the biasing force of the spring 128, an input port 142D and an output port 144D formed in a sleeve 122D are placed in communication with each other through a communicating portion 158D of the spool 124D while a drain port 146D is blocked by a land 156D of the spool 124D. Accordingly, the maximum hydraulic pressure is acted on the clutch C2. When the coil 132 is energized, the plunger 136 is attracted to the first core 134 by the attractive force corresponding to the amount of current applied to the coil 132 and the shaft 138 is then pushed out, and the spool 124D in abutment on the tip of the shaft 138 is moved towards the end plate 126. Accordingly, the input port 142D, the output port 144D, and the drain port 146D are placed in communication with one another, and a part of the hydraulic oil input from the input port 142D is output to the output port 144D and the rest of the hydraulic oil is output to the drain port 146D. Further, the hydraulic oil is supplied to a feedback chamber through a feedback port 148D, and the feedback force corresponding to the output pressure of the output port 144D is acted on the spool 124D in the direction towards the end plate 126. Consequently, the spool 124D stops at the position where the thrust force (attractive force) of the plunger 136, the spring force of the spring 128, and the feedback force just balance out. In this case, the larger the amount of current applied to the coil 132, more specifically, the larger the thrust force of the plunger 136, the more the spool 124D moves towards the end plate 126, thereby reducing the opening area of the input port 142D and expanding the opening area of the drain port 146D. When the current applied to the coil 132 is maximized, the spool 124D is moved to the position that is closest to the end plate 126 within the range of movement of the plunger 136, and thus the input port 142D is blocked by the land 154D while the output port 144D and the drain port 146D are placed in communication with each other through the communicating portion 158D. Accordingly, no hydraulic pressure is acted on the clutch C2. As described above, in the solenoid valve 120D of the modification example, when the coil 132 is not being energized, as the input port 142D and the output port 144D are placed in communication with each other while the drain port 146D is blocked, it is apparent that the solenoid valve 120D of the modification example functions as a normal-open type solenoid valve. In a pump section 160D of the solenoid valve 120D of the modification example, both a suction check valve 180D and a discharge check valve 190D are to be incorporated into the valve body 110 external to the sleeve 122D. The pump section 160D of the solenoid valve 120D is adapted such that, when the solenoid section 130 is de-energized from the energized state, the spool 124D is moved towards the solenoid section 130 by the biasing force of the spring 128 making inside the pump chamber 170D under a negative pressure, thereby sucking hydraulic oil from the suction port 162D and, when the solenoid section 130 is energized from the de-energized state, the spool 124D is moved towards the end plate 126 by the thrust force of the solenoid section 130 making inside the pump chamber 170D under a positive pressure, thereby discharging the sucked hydraulic oil from the discharge port 164D. Naturally, both the suction check valve 180D and the discharge check valve 190D are not limited to be incorporated into the valve body 110 external to the sleeve 122D, and only the suction check valve 180D may be built into the sleeve 122D, only the discharge check valve 190D may be built into the sleeve 122D, or both the suction check valve 180D and the discharge check valve 190D may be built into the sleeve 122D.

In the solenoid valve 120D of the modification example described above, the solenoid section 130 tends to become larger than when applied to a normal-closed type linear solenoid valve. This is because, while the direction of feedback force acting on the spool 124 is in an opposite direction to the thrust force of the solenoid section 130 in a normal-closed type linear solenoid valve, the direction of feedback force acting on the spool 124 is the same as that of the thrust force of the solenoid section 130 in a normal-open type linear solenoid valve. Accordingly, as the spring load of the spring 128 needs to be large, the thrust force required for the solenoid section 130 becomes large in that respect when functioning as a solenoid pump.

Here, the correspondence relation of the major elements of the present embodiment with respect to the major elements of the present invention described in Detailed Description of the Embodiment will be described. In the present embodiment, the solenoid valve 120 corresponds to the "solenoid device", and the ATECU 39 for carrying out the auto-stop control routine shown in FIG. 7 corresponds to the "control unit". Further, the solenoid section 130 corresponds to the "solenoid section", and the spring 128 corresponds to the "elastic member". Still further, the spool 124 corresponds to the "valve element". The engine 22 corresponds to the "internal combustion engine", and the automatic transmission 30 corresponds to the "power transmission apparatus". The mechanical oil pump 41 corresponds to the "mechanical pump", and the switching valve 50 corresponds to the "switching valve". It is to be noted that, the "internal combustion engine" is not limited to an internal combustion engine that outputs power by hydrocarbon fuels such as gasoline or diesel oil, and it may be an engine of any type including a hydrogen engine. The "power transmission apparatus" is not limited to the automatic transmission 30 of five speeds, i.e., first to fifth forward speeds, and may be an automatic transmission of any speeds including four speeds, six speeds, eight speeds and the like. The "power transmission apparatus" is not limited to an automatic transmission. For example, the "power transmission apparatus" may be connected directly to the crankshaft 26 of the engine 22 (i.e., to the torque converter 28) with a clutch and connected to the driving wheels 74a and 74b via the differential gear 72 and thus, may be anything so long as the "power transmission apparatus" is provided with any clutch and is capable of establishing a connection and breaking the connection between an output shaft of the internal combustion engine and a shaft on an axle side by switching an engagement state of the clutch. The "solenoid pressure adjusting pumping unit" is not limited to the unit for pumping hydraulic fluid to the clutch C1 establishing the first forward speed. For example, when any speed other than the first forward speed (e.g., second forward speed) is set as the speed for starting off the vehicle according to an instruction of the driver or the running state, the "solenoid pressure adjusting pumping unit" may pump hydraulic oil to the clutch or brake establishing that speed. The "auto-stop control unit" is not limited to the ATECU 39, and the ATECU 39, the engine ECU 24 and the main ECU 60 may be integrated, or the ATECU 39 may be realized by a plurality of electronic control units. Since the correspondence relation of the major elements of the present embodiment with respect to the major elements of the present invention described in Detailed Description of the Embodiment is an example for specifically explaining the embodiment of the present invention, it is not intended to limit in any way the elements of the present invention described in Detailed Description of the Embodiment. More specifically, the aspects of the present invention described in Detailed Description of the Embodiment should be interpreted based on the description thereof, as the embodiment of the present invention is merely a specific example of the present invention described in the Detailed Description of the Embodiment.

While the preferred embodiment of the present invention is described in details above, the present invention is not limited to the specific embodiment and, within the spirit and scope of the present invention, various modifications and alternations may be made.

The present application is based upon and claims the benefit of priority from the Japanese Patent Application No. 2008-196591, filed on Jul. 30, 2008; the entire contents of which are incorporated herein by reference.

The present invention can be utilized in the automotive industry.

What is claimed is:

1. A drive unit that drives a power transmission apparatus in a vehicle provided with an internal combustion engine capable of being automatically stopped and automatically started and the power transmission apparatus having a friction engagement element and being capable of establishing a connection and breaking the connection between an output shaft of the internal combustion engine and a shaft on an axle side by switching an engagement state of the friction engagement element, the drive unit comprising:
a solenoid device that includes:
a solenoid section having a movable portion that abuts on a case to arrive at an initial state when de-energized;
a pump section axially sliding in association with a movement of the movable portion by an electromagnetic force of the solenoid section and pumping a hydraulic fluid by reciprocation; and
an elastic member biasing the pump section in a direction counter to the electromagnetic force of the solenoid section; and
a control unit that controls the solenoid device so that a current applied to the solenoid section is repeatedly increased and decreased between an upper limit value and a lower limit value that is greater than 0, wherein:
the solenoid device includes a valve element that adjusts a fluid pressure from a fluid pressure source,
the pump section pumps the hydraulic fluid by reciprocation of the valve element sliding in association with the movement of the movable portion, and
the control unit is a unit that, when the internal combustion engine is automatically stopped, repeatedly increases and decreases the current applied to the solenoid section between an upper limit value and a lower limit value that is set to a first predetermined current in preparation for causing the solenoid device to function as a pump while the solenoid device adjusts and supplies the fluid pressure from the fluid pressure source to the friction engagement element, and thereafter repeatedly increases and decreases the current applied to the solenoid section between the upper limit value and a lower limit value that is set to a second predetermined current smaller than the first predetermined current and greater than 0.

2. The drive unit according to claim 1, wherein
the power transmission apparatus is an automatic transmission, and
the friction engagement element is a friction engagement element for starting off a vehicle.

3. A vehicle, comprising:
an internal combustion engine capable of being automatically stopped and automatically started;
a power transmission apparatus having a friction engagement element and being capable of establishing a connection and breaking the connection between an output shaft of the internal combustion engine and a shaft on an axle side by switching an engagement state of the friction engagement element; and
the drive unit according to claim 1 that drives the power transmission apparatus.

4. A drive unit that drives a power transmission apparatus in a vehicle provided with an internal combustion engine capable of being automatically stopped and automatically started and the power transmission apparatus having a friction engagement element and being capable of establishing a connection and breaking the connection between an output shaft of the internal combustion engine and a shaft on an axle side by switching an engagement state of the friction engagement element, the drive unit comprising:
a solenoid device that includes:
a solenoid section having a movable portion that abuts on a case to arrive at an initial state when de-energized;
a pump section axially sliding in association with a movement of the movable portion by an electromagnetic force of the solenoid section and pumping a hydraulic fluid by reciprocation; and
an elastic member biasing the pump section in a direction counter to the electromagnetic force of the solenoid section;
a control unit that controls the solenoid device so that a current applied to the solenoid section is repeatedly increased and decreased between an upper limit value and a lower limit value that is greater than 0;
a mechanical pump driven by power from the internal combustion engine to pump the hydraulic fluid; and
a hollow sleeve in which various ports are formed, a spool that is a shaft-like member inserted into the sleeve and capable of opening and closing the various ports by axially sliding, the elastic member axially biasing the spool, and the solenoid section generating a thrust force with respect to the spool in a direction opposite to the elastic member, as the solenoid device, wherein
an input port for inputting the hydraulic fluid pumped from the mechanical pump, an output port for outputting the hydraulic fluid to the friction engagement element, and a discharge port are formed as the various ports,
a pressure adjusting chamber is formed between the sleeve and the spool to function as a pressure adjusting valve that adjusts, while discharging from the discharge port, a fluid pressure input from the input port by axial sliding of the spool and that outputs the adjusted fluid pressure to the output port,
a suction port and a discharge port for discharging the hydraulic fluid to the friction engagement element are formed as the various ports,
a pump chamber is formed between the sleeve and the spool as a space blocked from the pressure adjusting chamber to function as a pump that sucks the hydraulic fluid via the suction port by sliding of the spool caused by a biasing force of the elastic member when the thrust force of the solenoid section is released, and that discharges the sucked hydraulic fluid via the discharge port by sliding of the spool caused by the thrust force generated by the solenoid section, and the control unit is a unit that operates the internal combustion engine, and, when the internal combustion engine is automatically stopped by breaking the connection between the output shaft of the internal combustion engine and the shaft on the axle side by engaging the friction engagement element using the solenoid device caused to function as the pressure adjusting valve, repeatedly increases and decreases the current applied to the solenoid section between an upper limit value and a lower limit value that is set to a first predetermined current in preparation for causing the solenoid device to function as the pump while the pressure adjusting valve supplies the fluid pressure to the friction engagement element, and thereafter repeatedly increases and decreases the current applied to the solenoid section between the upper limit value and a lower limit value that is set to a second predetermined current smaller than the first predetermined current, so that, by causing the solenoid device to function as the pump, the friction engagement element is held under a low pressure condition that is lower than a pressure under which the friction engagement element fully engages.

5. The drive unit according to claim 4, further comprising a switching valve for selectively switching a connection of a flow passage formed between the pressure adjusting section of the solenoid device and the friction engagement element and a connection of a flow passage formed between the pump section of the solenoid device and the friction engagement element using the hydraulic fluid pumped from the mechanical pump.

6. The drive unit according to claim 5, wherein the switching valve is a valve that discharges the hydraulic fluid in the pump chamber in association with blocking of the flow passage formed between the discharge port of the pump section and the friction engagement element.

* * * * *